(12) United States Patent
Wielebski et al.

(10) Patent No.: US 6,898,483 B2
(45) Date of Patent: May 24, 2005

(54) DRIVER BOARD CONTROL SYSTEM FOR MODULAR CONVEYOR WITH ADDRESS-BASED NETWORK FOR INTER-CONVEYER COMMUNICATION

(75) Inventors: Wayne Wielebski, New Berlin, WI (US); John P. Caspers, Racine, WI (US); Gregory A. Majcher, Broadview Heights, OH (US); Steven P. Blech, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/768,494

(22) Filed: Jan. 30, 2004

(65) Prior Publication Data

US 2004/0186615 A1 Sep. 23, 2004

Related U.S. Application Data

(63) Continuation of application No. 10/309,400, filed on Dec. 5, 2002, now Pat. No. 6,701,214, which is a continuation of application No. 09/729,486, filed on Dec. 4, 2000, now Pat. No. 6,522,944, which is a continuation-in-part of application No. 09/669,822, filed on Sep. 26, 2000, now abandoned, and a continuation-in-part of application No. 09/644,635, filed on Aug. 23, 2000, now Pat. No. 6,745,232, and a continuation-in-part of application No. 09/574,982, filed on May 19, 2000, now Pat. No. 6,701,462, and a continuation-in-part of application No. 09/559,625, filed on Apr. 27, 2000, now Pat. No. 6,591,311.

(51) Int. Cl.[7] .............................. G06F 7/00; B65G 13/06
(52) U.S. Cl. .................... 700/230; 700/229; 198/781.06
(58) Field of Search ................................ 700/224, 225, 700/228, 229, 230; 198/781.06, 781.09, 781.1, 860.3

(56) References Cited

U.S. PATENT DOCUMENTS

| | | | | | |
|---|---|---|---|---|---|
| 5,285,887 | A | * | 2/1994 | Hall | 198/460.1 |
| 5,582,286 | A | * | 12/1996 | Kalm et al. | 198/781.06 |
| 5,862,907 | A | * | 1/1999 | Taylor | 198/781.05 |
| 6,021,888 | A | * | 2/2000 | Itoh et al. | 198/783 |
| 6,035,999 | A | * | 3/2000 | Hall | 198/781.06 |
| 6,244,421 | B1 | * | 6/2001 | Hall | 198/460.1 |
| 6,253,906 | B1 | * | 7/2001 | Hall | 198/460.1 |
| 6,253,909 | B1 | * | 7/2001 | Kalm et al. | 198/781.06 |

* cited by examiner

Primary Examiner—Gene O. Crawford
(74) Attorney, Agent, or Firm—Amin & Turocy LLP; R. Scott Speroff

(57) ABSTRACT

A method and control system are provided for controlling a modular conveyor system, which may be networked together with other such systems in order to implement a control strategy for a modular conveyor system. The control system comprises a communications port for interconnection of the control system with a network for sending outgoing addressed data to other devices on the address-based network and for receiving incoming addressed data from other devices. The control system further comprises a logic system, which may receive a signal from an object sensor and provide a control signal or output adapted to control activation of a motorized roller assembly, based on an input signal from the object sensor or the communications port. The logic system may provide for single step operation whereby system troubleshooting may be facilitated, and in addition may provide situation aware and output value source selection functionality.

31 Claims, 24 Drawing Sheets

DRIVER BOARD CONTROL SYSTEM FOR MODULAR CONVEYOR WITH ADDRESS-BASED NETWORK FOR INTER-CONVEYER COMMUNICATION

CROSS-REFERENCE TO RELATED APPLICATIONS

This application is a continuation of U.S. patent application Ser. No. 10/309,400, filed on Dec. 5, 2002, now U.S. Pat. No. 6,701,214, entitled DRIVER BOARD CONTROL SYSTEM FOR MODULAR CONVEYOR WITH ADDRESS-BASED NETWORK FOR INTER-CONVEYER COMMUNICATION, which is a continuation of U.S. patent application Ser. No. 09/729,486 filed on Dec. 4, 2000, now U.S. Pat. No. 6,522,944, entitled DRIVER BOARD CONTROL SYSTEM FOR MODULAR CONVEYOR WITH ADDRESS-BASED NETWORK FOR INTER-CONVEYOR COMMUNICATION, which is a continuation-in-part of U.S. patent application Ser. Nos. 09/559,625 filed Apr. 27, 2000, now U.S. Pat. No. 6,591,311; 09/574,982 filed May 19, 2000, now U.S. Pat. No. 6,701,462; 09/644,635 filed Aug. 23, 2000, now U.S. Pat. No. 6,745,232; and 09/669,822 filed Sep. 26, 2000, now abandoned, the entireties of all such applications of which are incorporated herein by reference.

TECHNICAL FIELD

The present invention relates to the art of industrial controllers, and more particularly to systems and methods for controlling a modular conveyor.

BACKGROUND OF THE INVENTION

Industrial controllers are special purpose computers used for controlling industrial processes, manufacturing equipment, and other factory automation, such as conveyor systems. In accordance with a control program, the industrial controller measures one or more process variable or inputs reflecting the status of a controlled conveyor system, and changes outputs effecting control of the conveyor system. The inputs and outputs may be binary, (e.g., on or off), as well as analog inputs and outputs assuming a continuous range of values. The control program may be executed in a series of execution cycles with batch processing capabilities.

The measured inputs received from a conveyor system and the outputs transmitted to the conveyor system generally pass through one or more input/output (I/O) modules. These I/O modules serve as an electrical interface between the controller and the conveyor system, and may be located proximate or remote from the controller. The inputs and outputs may be recorded in an I/O table in processor memory. Input values may be asynchronously read from the controlled conveyor system by one or more input modules and output values are written directly to the I/O table by the processor for subsequent communication to the conveyor system by specialized communications circuitry. An output module may interface directly with a conveyor system, by providing an output from an I/O table to an actuator such as a motor, valve, solenoid, and the like.

During execution of the control program, values of the inputs and outputs exchanged with the conveyor system may pass through the I/O table. The values of inputs in the I/O table are asynchronously updated from the controlled conveyor system by dedicated scanning circuitry. This scanning circuitry may communicate with input modules over a bus on a backplane or network communications. The scanning circuitry also asynchronously writes values of the outputs in the I/O table to the controlled conveyor system. The output values from the I/O table are then communicated to one or more output modules for interfacing the conveyor system. Thus, the processor may simply access the I/O table rather than needing to communicate directly with the conveyor system.

An industrial controller may be customized to the particular process by writing control software that may be stored in the controller's memory and/or by changing the hardware configuration of the controller to match the control task. Controller hardware configuration is facilitated by separating the industrial controller into a number of control modules, each of which is performing a different function. Particular control modules needed for the control task may then be connected together on a common backplane within a rack. The control modules may include processors, power supplies, network communication modules, and I/O modules exchanging input and output signals directly with the controlled conveyor system. Data may be exchanged between modules using a backplane communications bus, which may be serial or parallel. A typical hardware modification may involve adding additional I/O modules in order to be able to control additional equipment.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more output modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an explicit message or an I/O message. The output module receiving such a message will provide a corresponding output (analog or digital) to the controlled process.

Control systems are often employed in association with conveyor systems for moving objects along guided tracks, including modular conveyor sections or "sticks". Conveyor systems for moving objects between stations in a manufacturing environment or for accumulating and distributing products in a warehouse operation are well known in the art. Such conveyor systems provide upwardly exposed conveying surfaces, such as rollers, positioned between guiding side rails. The rollers are powered by controllable motors to move objects placed on top of them along a track defined by the rails.

Assembly of conveyor systems is facilitated by the use of "conveyor sticks" which may include one or more short sections of rollers and guide rails, which are connected together to form the final conveyor system. The conveying surface of each conveyor stick may be broken up into one or more zones, each associated with a sensor for detecting the presence of an object on the conveyor at the zone. A control circuit communicates with each zone and sensor via a number of cables to control the zones, in order to accomplish a number of standardized tasks.

Such conveyor systems may be adapted to perform one or more tasks or operations. One such task is that of "accumulation" in which a control circuit for a given zone operates its rollers when the sensor, in an upstream zone, indicates an object is at that zone and the sensor of a "downstream" zone indicates that no object is in that downstream zone. This logic causes the conveyor zones to move objects along to fill all zones with objects. In a "slug release" operation, each control circuit in a defined release zone operates its rollers if its sensor indicates an object is present and no object is in the downstream zone from the defined release zone. This logic causes the emptying of a predefined section of the conveyor, typically to a downstream portion. A third mode of operation is "singulation release" in which a single object at a time is unloaded from the conveyor system. Each upstream control circuit operates its rollers to move its objects downstream one zone.

In order to perform these tasks, the control circuit for a particular conveyor stick may communicate in a limited fashion with the control circuits (or at least the sensors) of associated upstream and downstream conveyor sticks. This may be accomplished via cabling between control cards or sensors of the conveyor sticks, typically within one of the side rails. The conveyor system may operate without the need for a central controller, for example, such as where one or more I/O points are provided for each zone, thus reducing the wiring associated therewith. By eliminating the need for such wiring, the conveyor sticks can be easily assembled or reconfigured. Nevertheless, the lack of central control makes the conveyor system relatively hard to reconfigure requiring, for example, settings to being manually adjusted on each controller board when delay times and conveyor speeds are changed. Further, lack of centralized communication between components of the conveyor system makes it difficult to detect and report conveyor system problems such as motor failure or material jamming.

Some conventional control devices and systems for such conveyor systems provide outputs solely based on messages from a network, having no internal logic. For example, such a device may provide an output according to an output value received in an I/O message from a master (e.g., a PLC), and may maintain that value during normal operation until another message is received. In some such devices, certain conditions can affect the output value. For instance, when a module detects a communications fault, the output may go to a known state. However, there are many sources that may affect an output point's value. These include an I/O message, an explicit message, local logic, fault or idle values, and/or a forcing message. Heretofore, the source of an output value was determined according to fixed controller architecture constraints. Thus, a user had limited ability to decide priorities for the source of a conveyor system output module's output value. In addition, there are many conditions or events associated with conveyor systems for which it may be desirable to provide another output value to the device. Heretofore, a user had no ability or a limited ability to define output device behavior in lieu of regular I/O messages.

In addition, some conventional conveyor control devices provide a run mode wherein a module executes a control program and a configure mode wherein the control program execution is suspended. As conveyor control systems become more widely distributed, the logic or control program associated with a particular system may be executed on a large number of modules or devices. In this way, individual processors in the devices execute a program autonomously from the rest of the system components. Smart devices, such as I/O modules, transducers, sensors, valves, and the like may thus be programmed to execute certain logical or other programs or operations independently from other such devices.

The distribution of smart devices in a networked conveyor control system has many advantages. However, system testing and troubleshooting are often more difficult in distributed systems. In a system with many autonomous smart devices, each having its own control logic or program, problems in system performance cannot easily be traced to a specific device. Once the component devices in such a system are placed into execute or run mode, the logic or control programs associated therewith run independently, and are often not synchronized. Even where certain conveyor control devices in a system are synchronized to certain events, determining the source of a system control problem is still difficult.

In many cases, the source of a control problem is an error in programming a particular module. For example, the logic function in a particular module may be the function of several input values or states. Problems in the logic function may only be discernable in one or a small number of input combinations. In widely distributed conveyor control system architectures, system events occur asynchronously, such as I/O value state changes, messages, etc. Thus, when a problem occurs, it may be difficult to determine the source of the error.

This is particularly problematic in system startup situations. Large conveyor control systems are typically tested before application to a real process, with inputs simulated and outputs tested under a variety of input conditions. In addition, control system diagnostics are needed in the field, when problems in system performance are recognized, or when system parameters are changed. Present diagnostic tools are typically limited to simulating input signals and monitoring output values. Conventional control devices do not provide for ease of troubleshooting in such distributed conveyor control system applications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a conveyor control system, which may be networked together with other such systems in order to implement a control strategy for a modular conveyor system. An address-based network connects control components within conveyor sticks together allowing control, monitoring or configuration of the components within the conveyor sticks from a central device. The control system according to the invention may further be adapted to perform self-configuration, whereby individual control systems may configure themselves on power up in order to communicate with one or more adjacent or related control systems, in order to effectuate a control strategy for the conveyor system. The conveyor control system may also be employed in non-modular or continuous conveyor systems in accordance with the invention.

The conveyor sections may comprise separated upstream and downstream ends having mechanical connectors for connecting to downstream and upstream ends, respectively, of other conveyor sections. The conveyor sections support motorized roller assemblies and associated object sensors sensing objects on the conveyor section. A communications port in the individual control systems provides for interconnection of the control system with the address-based network for sending outgoing addressed data to other devices on the address-based network and for receiving incoming addressed data from other devices. Moreover, the control system communications ports may provide for sending and receiving broadcast messages as well as individually addressed messages, for example, wherein a control system may send a universal broadcast message to all devices on the network.

The control system further comprises a logic system communicating with or being part of the communications port, which may receive a signal from an object sensor and provide a control signal or output adapted to control activation of a motorized roller assembly, based on an input signal from the object sensor or the communications port. For example, an external object presence signal associated with at least one of the other conveyor sections or another component within a conveyor section may be received by the communications port from the address-based network. The invention further contemplates control systems having a logic system, where the control system provides a sensor functionality, whereby the presence of an object is sensed, and a signal or message is provided to the address-based network. Accordingly, the logic system may further transmit an object presence signal as outgoing addressed (e.g., or broadcast) data through the communications port, independent of whether an output or control signal is provided by the control system. The logic system may be further adapted to perform situation-aware configuration and execution functions and output value source selection functions in order to reduce or minimize the above-mentioned shortcomings in conventional conveyor controls, and/or may support single-stepped or strobed synchronization to facilitate conveyor system setup and diagnostics. It will be appreciated that the strobed synchronization or single-step mode of operating the control system may be employed in addition to communications protocols wherein a master device sends a strobe or broadcast message to a plurality of slave devices on a network, to which slaves may then respond one after another according to their individual network address settings, which is sometimes referred to as strobed communications. In this regard, the methods and systems of the present invention find application in association with numerous communications protocols, including polled communications, strobed or broadcast communications, and others, and it will be understood that such communications protocols fall within the scope of the present invention. The logic system, moreover, may comprise separate program attributes for different drive roller products made by different vendors.

In accordance with one aspect of the invention, there is provided a control system for a modular conveyor, such as a conveyor having a motorized roller for moving objects on the modular conveyor and an object sensor for sensing objects on the modular conveyor. The control system comprises a drive controller adapted to control a motorized roller in the modular conveyor, a communications port adapted to connect the control system to an address-based network, to send outgoing addressed data to other devices in the address-based network, and to receive incoming addressed data from the address-based network. The control system further comprises a logic system adapted to receive an input signal from either the object sensor or the communications port or both, and to provide a roller control signal to the motorized roller according to the input signal.

In accordance with another aspect of the invention, the logic system may comprise an output module, which includes a value source selector adapted to receive messages from the address-based network, and a local logic function associated with the value source selector to create a binding and providing a signal thereto. The logic function may further include an output receiving an output value from the value source selector based on the signal from the local logic function, and having an output signal. The value source selector may be adapted to selectively ignore I/O and explicit messages from the address-based network based on the binding and to selectively use an idle action and set the output value according to an idle value when the local logic function is disabled. In addition, the value source selector may selectively use a fault action and set the output value according to a fault value based on an override attribute, and selectively ignore idle messages according to the override attribute.

According to yet another aspect of the present invention, the logic system may comprise an output providing an output signal according to an output value, an indicator adapted to receive message information from the communications port and providing indicator data, and a logic unit, which receives message information from the communications port and indicator data from the indicator. The logic unit is adapted to perform a logic function, and to selectively provide the output value to the output according to the message information or the logic function.

The logic unit may thus take into account indicator data in determining the output value, which was possible in previous conveyor controllers. For example, the indicator data may include an I/O connection health indicator, a messaging connection health indicator, an I/O connection error indicator, a run event indicator, and idle event indicator, a network error indicator, an I/O point fault indicator, a hardware input indicator, a hardware output indicator, and I/O data. The control system thus allows a user to define both the status/event indicators which will be considered, as well as the decisional logic used in providing an output value to the output of the device. The logic unit, for example, may comprise a processor or other logic device, which may be configured by a user to perform various functions, such as boolean operations, flip-flops, counters, and/or timers.

In accordance with still another aspect of the invention, a user may place one or more conveyor control systems or devices into a step mode, wherein the control systems are adapted to execute a specified number of iterations of their internal logic or control programs, or execute such programs for a specified time period, and then stop or suspend execution. The user may then perform system diagnostics, for example, by interrogating certain conveyor section controllers to obtain status information, output and input values, and the like. The system may then be further iterated and the process repeated, in order to enable the identification of logic programming and/or hardware problems in a system. In this regard, the logic system may be adapted to execute a stored program and to receive a message from a master device via the communications port, wherein the message comprises a parameter. The logic system is further adapted to execute at least a portion of the stored program according to the parameter and to subsequently suspend execution of the stored program according to the parameter. The invention thereby provides significantly improved diagnostic and troubleshooting capabilities over conventional conveyor control systems and devices.

According to another aspect of the invention, a method is provided for controlling a modular conveyor system. The method may be implemented, for example, in a modular conveyor control system having a drive controller adapted to control a motorized roller as well as a communications port adapted to connect the control system to an address-based network. The method comprises providing a logic system in the control system, receiving an input signal from an object sensor associated with the modular conveyor or from the communications port, and providing a roller control signal to the motorized roller according to the input signal.

According to yet another aspect of the invention, the logic system comprises an output device adapted to provide an output according to an output value, wherein the method may further comprise associating the output device with a logic function, providing the output value according to the logic function, and ignoring explicit messages from the address-based network. In this regard, the method may further include ignoring value messages from the address-based network, selectively ignoring fault messages according to an override attribute, and selectively ignoring idle messages according to the override attribute.

According to another aspect of the invention, the logic system may comprise an output device having a device status, wherein the method further comprises associating the output device with a logic function in communication with the address-based network, and associating the logic function with an indicator. In addition, the method may include receiving a status message from the address-based network, receiving a value message from the address-based network, updating the indicator according to the status message and the device status, and selectively providing an output value to the output device from one of the logic function and the value message, according to the logic function.

According to still another aspect of the invention, the control system may be adapted to perform self-configuration. Thus, a control system may comprise a network address, which may be used to pre-configure links or associations with other related control systems in the conveyor system. For instance, each control system may automatically configure network links to send and/or receive information from adjacent (e.g., upstream and down-stream) or related control systems, in order to implement one or more particular control strategies associated with operation of the conveyor system.

This feature facilitates ease of setup of new conveyor systems as well as reconfiguration of existing systems, whereby manual reprogramming of individual control systems is minimized or reduced. For example, the control system having an address N may be configured on power up to receive a message from a system at address N−1 to indicate the presence (e.g., or absence) of an object in an up-stream conveyor section. Similarly, the control system (e.g., at address N) may further be automatically configured to provide a message to a down-stream conveyor section (e.g., at address N+1) indicating the presence of an object in the current conveyor section.

To the accomplishment of the foregoing and related ends, the invention, then, comprises the features hereinafter fully described. The following description and the annexed drawings set forth in detail certain illustrative aspects and implementations of the invention. However, these implementations are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
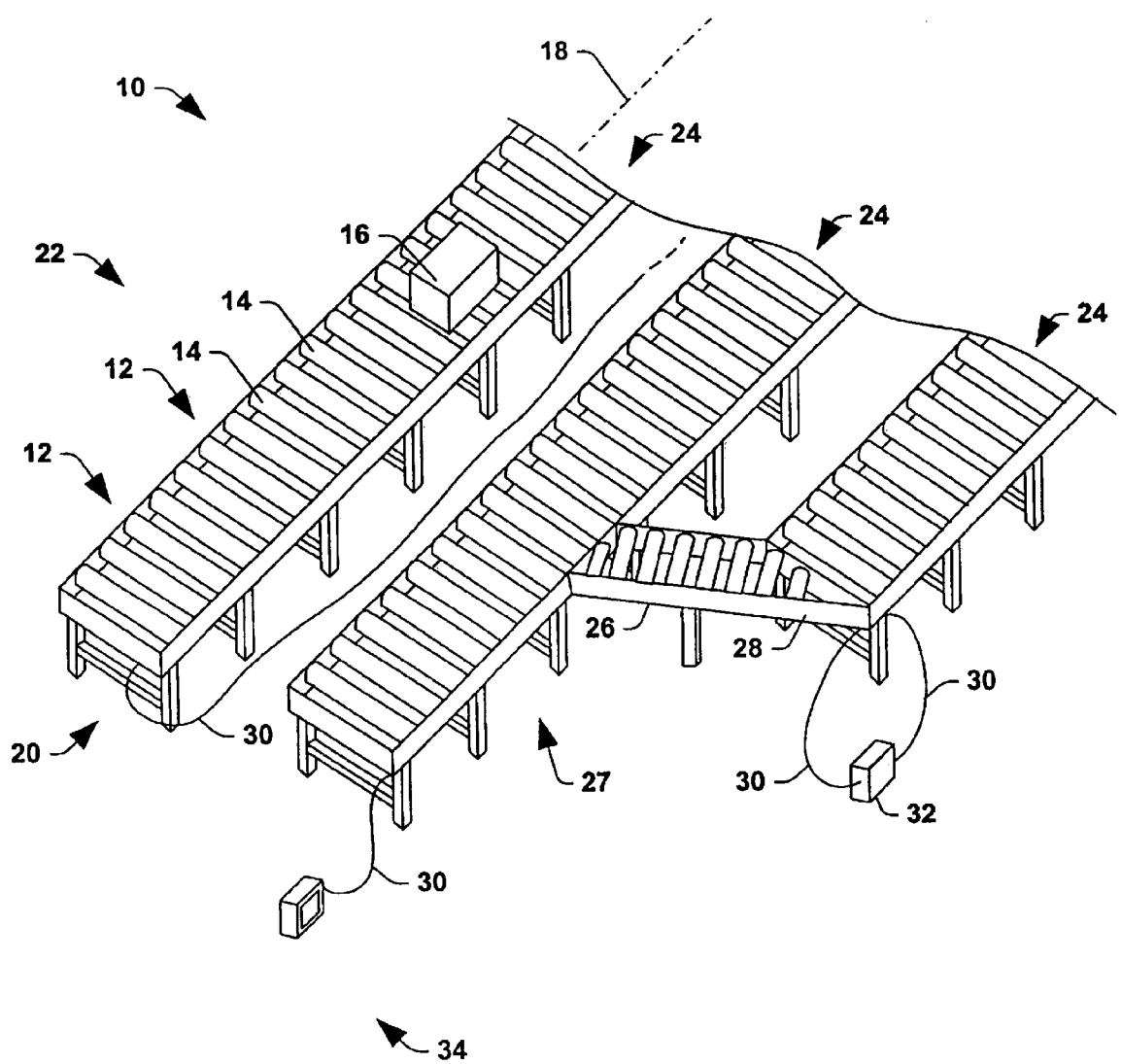
FIG. 1 is a perspective view of an exemplary multi-bank conveyor system made up of a variety of modular conveyor sticks, the banks having continuous network cables attached at one end to a central industrial controller.

The present invention is now described with reference to the drawings, wherein like reference numerals are used to refer to like elements throughout. In order to provide context for the various features and aspects of the present invention, an exemplary conveyor system is illustrated and described. Referring now to FIG. 1, an exemplary conveyor system 10 may be assembled from a plurality of conveyor sticks 12, each providing upwardly exposed rollers 14 for moving one or more objects 16 along a conveyor axis 18. The rollers 14 of the conveyor sticks 12 may be reversible, thus allowing the object 16 to be moved in either direction along axis 18 in a controlled fashion. Nevertheless, an arbitrary "upstream" end 20 and "downstream" end 22 may be defined for each conveyor section representing one direction of flow along axis 18 for the processes of accumulation and slug release.

The conveyor sticks 12 may be arranged in one or more parallel banks 24 and may include alternative conveyor sticks 26 having diverter branches 28 providing a bifurcated path splitting a single upstream bank 27 into multiple downstream banks 24. The diverter conveyor sticks 26 may include a movable wall (not shown), which pushes packages either to the left or to the right. As depicted at an upstream end 20 of the banks 24, a continuous network cable 30 may connect each bank 24 (e.g., upstream ends 20 of one bank 24 to the downstream ends 22 of a next bank 24) to a central programmable logic controller (e.g., PLC) 34 also as known in the art.

The network cable 30 provides for communication of data in packets having associated addresses identifying the destination and/or source of the data of the packet. This addressing allows the conductor of the network cable 30 to be shared among many devices while data may nevertheless be directed to or otherwise associated with particular ones of those devices. In this regard, a destination address may be linked to the packet indicating the device for which the data is intended. Alternatively or in combination, a source address may be attached to the packet and the device for which it is intended may have a stored table of addresses from which it will receive such packets. Broadcasting protocols may also be implemented on the network cable 30. The DeviceNet standard based on the CAN controller protocol may be suitable for this purpose but other network protocols may be used alternatively or in combination. For example, a network cable 30 for the DeviceNet standard employs four conductors, two for supporting data communication and two for providing power.

Figure 2:
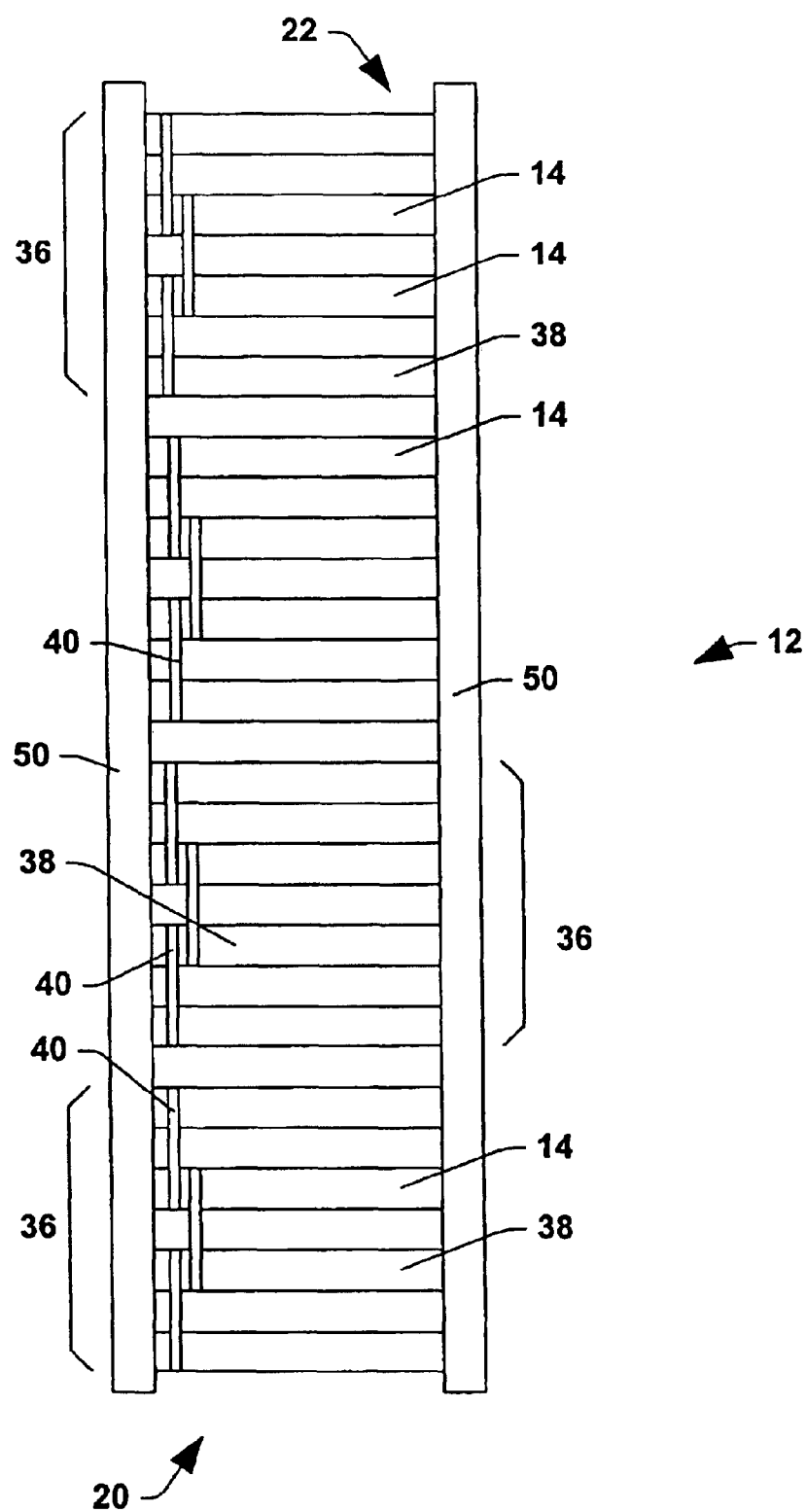
FIG. 2 is a top plan view of an exemplary conveyor stick of FIG. 1 showing its division into zones, each with a plurality of control systems, motors and sensors in accordance with the invention, wherein the control systems are connected together by a shared network cable section having connectors at upstream and downstream ends.
Figure 3:
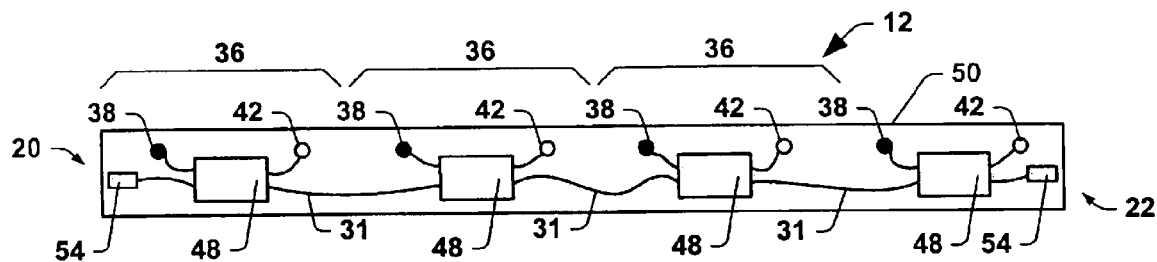
FIG. 3 is a side elevation view of the exemplary conveyor stick of FIG. 2.

Referring now to FIGS. 2 and 3, a single conveyor stick 12 divides its rollers 14 into multiple zones 36. Thus, for example, a conveyor stick 12 having a length between its upstream end 20 and its downstream end 22 over ten feet, may include four, 2.5 foot zones 36, each with multiple rollers 14. Each zone 36 may include one motorized roller assembly 38, for example, those having an internal motor mechanism of a type well known in the art. This motorized roller assembly 38 communicates its motion by means of belts 40 with the other rollers 14 of the zone 36. Positioned at a downstream end of each zone is a sensor 42 such as may receive a light beam (not shown) from an emitter (not shown), the beam crossing the upper surface of the last roller 14 of the zone 36 at its downstream side in a direction substantially perpendicular to the conveyor axis 18. An object (e.g., object 16) breaking the light beam, signals the presence of an object at the zone.

Figure 4:
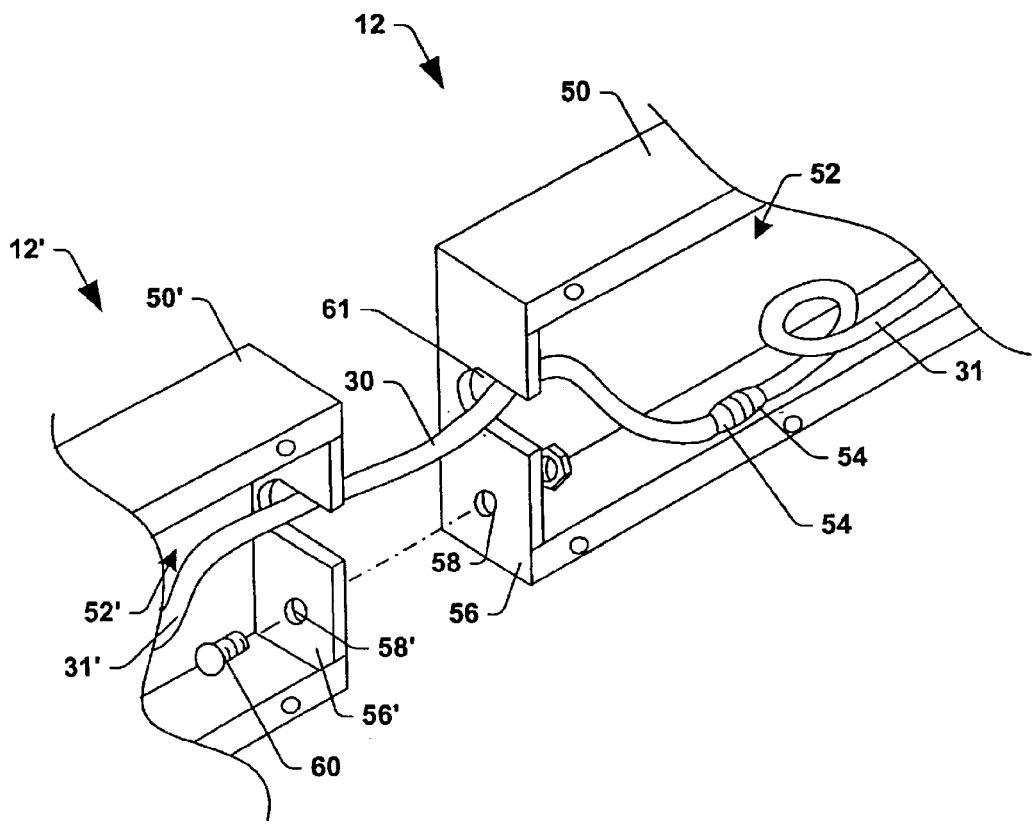
FIG. 4 is a detailed perspective view of the upstream end of the conveyor stick of FIGS. 2 and 3 illustrating connection of shared network cable sections between connected conveyor sections to form a continuous shared network cable.
Figure 5:
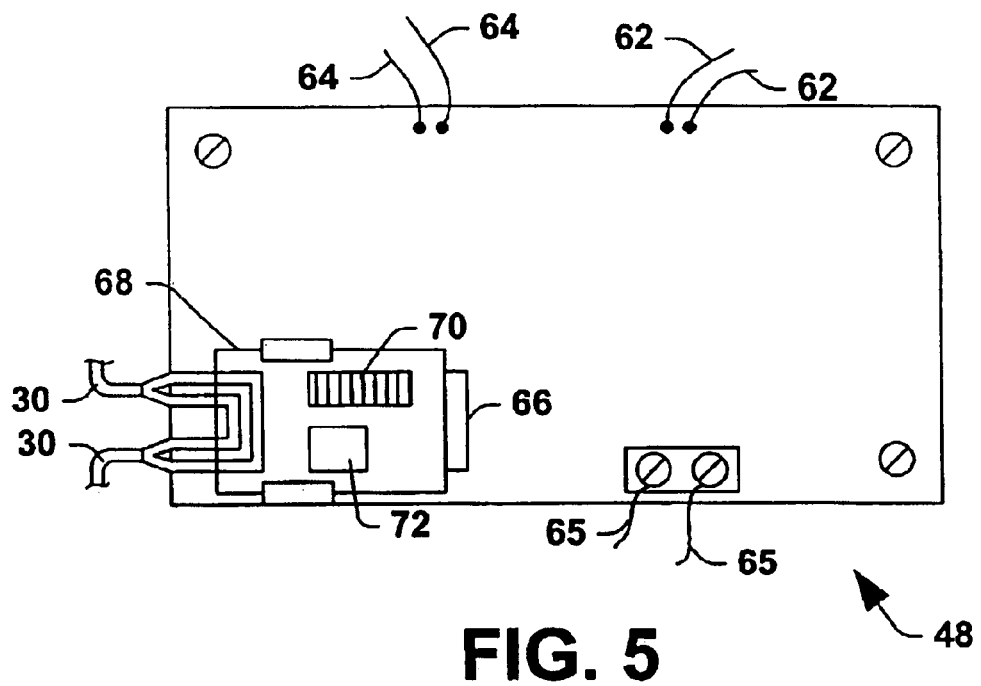
FIG. 5 is a side elevation view of an exemplary control system in accordance with an aspect of the invention, having a detachable communication port for receiving a shared network cable section and providing control logic for an associated zone of the conveyor stick.
Figure 6:
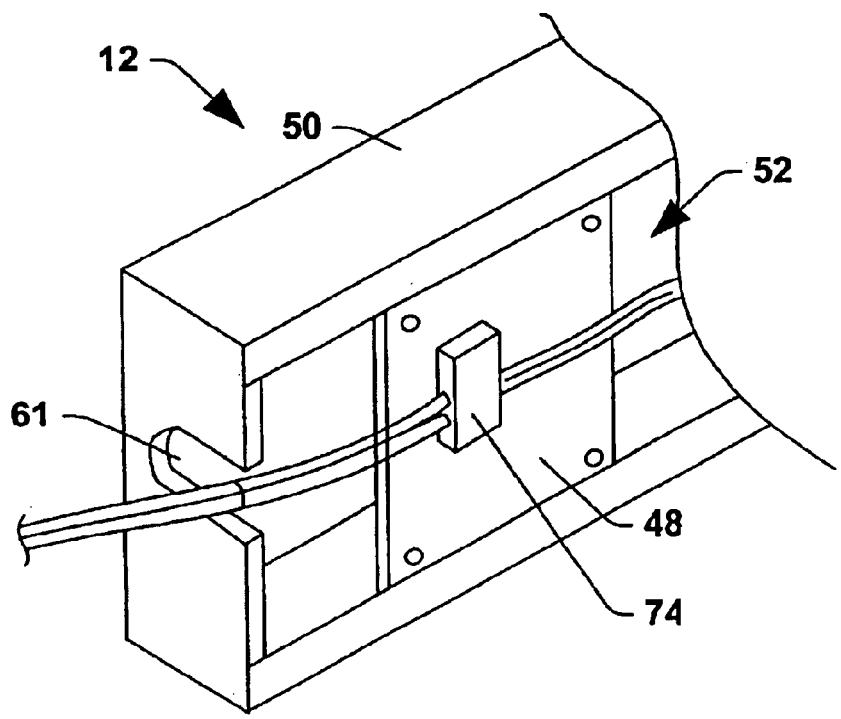
FIG. 6 is a figure similar to that of FIG. 3 showing an alternative wiring method using a semi-continuous network cable "daisy chained" along the rails of the conveyor sticks.

For each zone 36, a controller card or control system 48 communicates with the sensor 42 and with the motorized roller assembly 38 to provide control functions as will be described. Each control system 48 also communicates in shared fashion with a cable section 31. The cable section 31 runs in "daisy-chain" fashion connecting to each of control systems 48 of the conveyor stick 12, each control system 48 communicating with rollers and sensors of their respective zones 36. The diverter conveyor stick 26 of FIG. 1 may comprise a control system 48 (not shown) and thus may be easily integrated into the rest of the operation of the conveyor system 10. It will be appreciated that although the exemplary control system 48 is illustrated and described hereinafter with respect to modular conveyor systems, that the control system 48 may alternatively or in combination be employed in association with other (e.g., non-modular or continuous) conveyor systems in accordance with the present invention. Referring also to FIGS. 4–6, one implementation of the control system 48 provides for control leads 62 leading to the sensor 42 and power leads 64 leading to the motorized roller assembly 38. The control system 48 may comprise level shifting and power circuitry for supporting the motorized roller assembly 38 and the sensor 42. Separated power leads 65 provide power that may be switched by the control systems 48 directly to motors of the motorized roller assemblies 38. A connector 66 is provided to receive a network card 68, which attaches to the network cable and provides the necessary protocol for communication on the network cable 30. Other aspects of the control system 48 will be illustrated and described in greater detail hereinafter. The control systems 48 may be held by side panels 50 of the conveyor stick 12 which may further serve to support the rollers 14. The side panels 50 provide integral cable raceways 52 into which the control systems 48 may fit as well as the cable section 31. Cable section 31 terminates in connectors 54 at its upstream and down stream ends adjacent to the upstream and downstream ends of one of the side panels 50.

Referring now to FIG. 4, the side panels 50 terminate at their upstream and downstream ends 20 and 22 at a mechanical connector 56 being generally a plate perpendicular to the conveyor axis 18 and including two axial holes 58. The mechanical connector 56 and its axial holes 58 match with corresponding mechanical connectors 56' and holes 58' of an adjacent conveyor stick 12'. Fasteners 60 inserted through these holes 58' and 58 allow assembly of the conveyor sticks 12 together into a conveyor system 10. A notch 61 in the mechanical connector 56 permits passage of either cable section 31' into the raceway 52 or cable section 31 into the raceway 52' where they may be attached to each other via electrical connectors 54. A small amount of additional slack is provided in the cable sections 31 and 31' to permit this operation while preserving complete enclosure of the network cable 30 (made up of cable sections 31) within the raceway 52 or 52'. Thus, assembly of conveyor sticks 12 into a conveyor system 10 is a simple matter of joining mechanical connectors 56' and electrical connectors 54 of each new conveyor stick as it is added.

Referring to FIG. 5, the network card 68 may comprise an address switch 70 for setting a "media access layer" address of the control system 48 so that data sent on the network 30 by different devices (e.g., control systems 48 and/or central controller 34) may be distinguished. Before or at the time each conveyor stick 12 is added to the conveyor system 10, its control systems 48 may be given a unique address via the switches 70. Alternatively or in combination, the network address of the control system 48 may be programmed via messaging from the network 30. Where the address space (e.g., the total number of unique addresses allowed by the network) is limited to a number less than the total number of control systems 48, a bridge 32 (e.g., FIG. 1) may be connected between different groupings of the conveyor sticks 12. In this manner, an expansion may be provided of the addresses that may intercommunicate, as will be described further below.

During operation of the exemplary conveyor system 10, each control system 48 may receive data from the central controller 34. The control systems 48 may further provide data to the central controller 34 upon request from the central controller 34, for example, under a simple director/follower protocol. The network card 68 will decode only those messages addressed to it according to low level procedures well known in the art.

All pertinent data necessary for control of the conveyor stick may be downloaded from the central controller 34 to the control systems 48 including, for example, the desired motor speed and/or direction for the motorized roller assembly 38 and delay times between actuations of the motorized roller assembly 38 and changes of state of the sensor 42. Commands such as for accumulation, singulation release and slug release can be issued from a central location or from local switches on controllers also attached to the network cable 30. Likewise data from the control system 48 may be relayed to the central controller 34 including indications of jamming, the state of the sensor 42, the state of the motorized roller assembly 38, the temperature of the motorized roller assembly 38, current draw of the motor, etc. This information, as uploaded to central controller 34, may provide a centralized picture of the operation of the conveyor system 10

In addition, the central controller 34 may manage the interconnection of the control systems 48 with its adjacent zones in its conveyor stick 12, or in upstream or downstream conveyor sticks 12, by providing each control system 48 with the address of other control systems 48 associated with its upstream and downstream zones from which or to which sensor data may be sent. In another aspect of the invention, the control systems 48 may automatically configure themselves upon power up to send and receive such information from one or more other adjacent or otherwise associated control systems 48, for example, based on the network address setting (e.g., address switch 70). The provision of the address-based network 30 facilitates this self-configuration, and further provides for elimination of the dedicated wiring between conventional conveyor controllers heretofore required to implement information sharing between conveyor sections or zones. Further, reconfiguration of the conveyor system 10 may be easily performed from a central location.

The logic circuitry necessary for the control system 48 to perform the various operations such as accumulation, slug release, and singulation release, may comprise a single integrated circuit 72 in the network card 68, the integrated circuit 72 also providing the communication protocol with the network cable 30. As used herein, logic circuitry should be considered to embrace discrete logic devices implementing logical functions, programmable gate arrays and the like, and circuits such as microprocessors and microcontrollers executing a stored program. In this regard, the integrated circuit 72 may handle low-level protocols including timing, arbitration for the shared network cable and detection of network errors and the like. As described in greater detail hereinafter, the control system 48 may comprise a single integrated printed circuit board assembly having one or more of logic, I/O, communications, and power interfacing circuitry.

By investing the integrated circuit 72 with both communication protocol and control logic capabilities, the control system 48 may be extremely simple providing for only basic motor and sensor control activities while the logic of these operations is supported in the integrated circuit 72. Non-volatile memory within integrated circuit 72 allows reconfiguration of the logic by commands from the central controller 34 providing even greater configuration flexibility. After configuration by the central controller 34, much of the communication on the network cable 30 is peer to peer between control systems 48. The content of this communication may be similar to that of the prior art, however, it will be recognized that the data is communicated over the shared network cable 30, thereby reducing wiring burden in the raceways 52.

In accordance with another aspect of the invention, the central controller 34 may be eliminated or removed after configuration and the system may operate without the central controller 34 in a peer to peer mode. Alternatively, a simple interface device may be attached in lieu of the central controller 34 to provide an indication of the operation of the system.

Another aspect of the invention provides for self-configuration of the control systems 48 based on a network address (e.g., as set by address switch 70 or via programming commands). For instance, a first control system 48 having a network address N may be adapted to automatically configure itself to receive a message from another control system 48 having address N−1, which may be located upstream of the first control system 48. In this regard, the control systems 48 may communicate with each other in peer-to-peer fashion in order to share data, for example, to implement a conveyor control strategy such as singulation, accumulation, and the like. In addition, the first control system 48 may be adapted to automatically configure itself on power up to send a data message to a third control system 48 at network address N+1, for example, to indicate the status of the conveyor zone associated with the first control system 48 (e.g., object present, photoswitch on, etc.). Nevertheless, such peer-to-peer communication is not necessary and it is possible to operate the present invention in a mode in which all sensor signals are relayed to the central controller 34 and commands are returned to the individual control systems 48, and no logic need be included or programmed on the control systems 48.

Referring again to FIG. 1, multiple network cables 30 may be connected by a bridge 32 serving a number of different functions. The first function of the bridge 32 is that of mapping redundant address spaces to different addresses so that limited address space protocols such as CAN may be expanded arbitrarily. Thus if addresses one through 128 are used in each bank 24, the bridge 32 may concatenate a bank address to those addresses thereby differentiating them. Bridge 32 also allows interconnection of network cables 30 in situations where a straightforward daisy chaining is difficult, for example, between banks 24 or branches in the case of diverter conveyor sticks 26 which provide a branching topology.

Referring to FIG. 5, according to another aspect of the invention, the control systems 48 may be given insulation displacement type connectors 74 such as allow for connection of the control system 48 to a semi-continuous ribbon cable 76. After mechanical connection of the conveyor sticks 12 into banks 24, the entire data connection of the conveyor sticks 12 may be handled by unreeling the ribbon cable along the raceways 52 and clamping it along its length beneath the insulation displacement connectors 74. Higher gauge power wiring may then be run and the connection process is complete.

Figure 7:
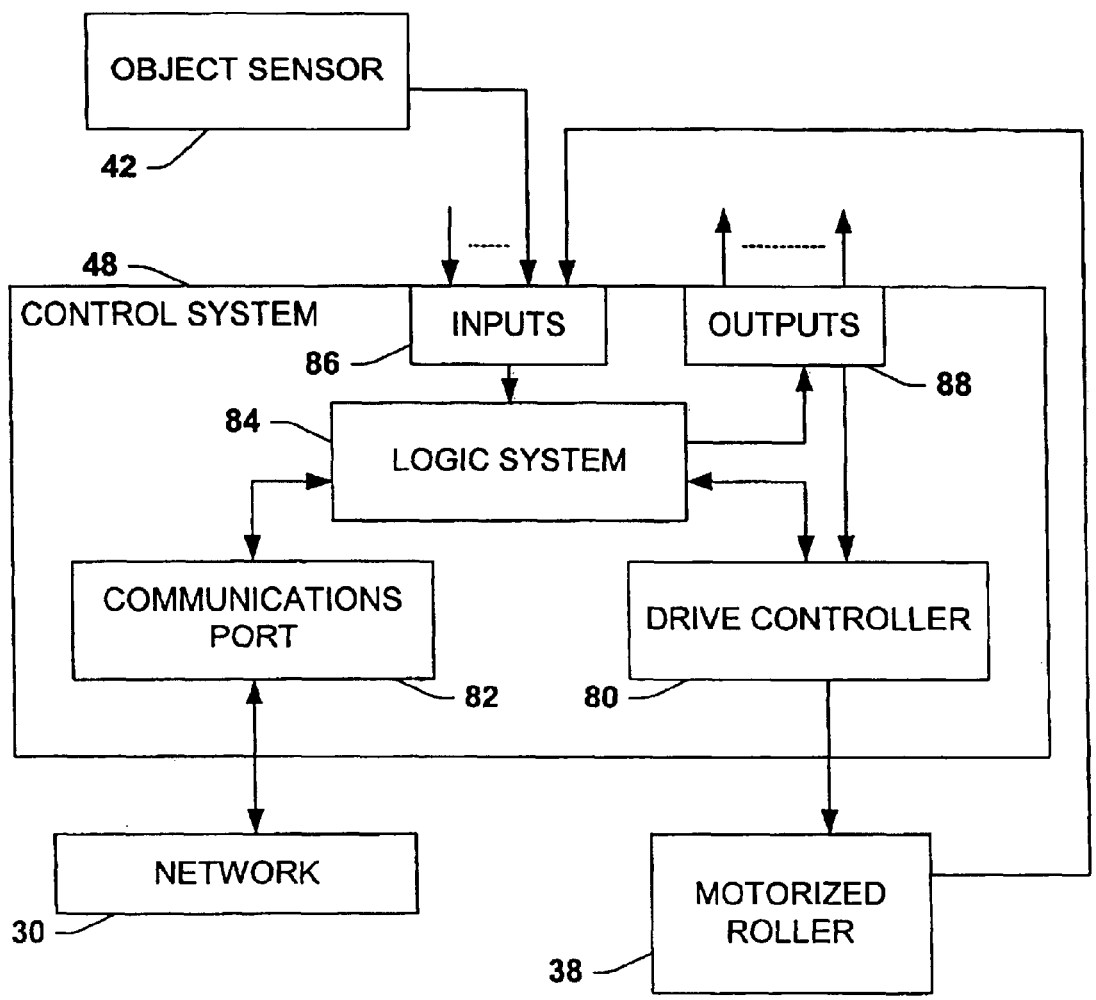
FIG. 7 is a schematic illustration of an exemplary control system for controlling a modular conveyor according to various aspects of the present invention.

Referring now to FIG. 7, an exemplary control system 48 is illustrated for controlling a modular conveyor (e.g., conveyor stick 12) having a motorized roller 38 for moving objects (e.g., object 16) on the modular conveyor and an object sensor 42 for sensing objects 16 on the modular conveyor 12. The control system 48 comprises a drive controller 80 adapted to control a motorized roller 38 in the modular conveyor 12, and a communications port 82 adapted to connect the control system 48 to an address-based network 30. The communications port 82 further provides for sending outgoing addressed data (not shown) to other devices in the network 30, and for receiving incoming addressed data from the network 30.

The control system 48 further comprises a logic system 84 adapted to receive an input signal from one of the object sensor 42 via one or more inputs 86 and the communications port 82. The logic system 84 also provides a roller control signal to the motorized roller 38 via drive controller 80 according to the input signal. According to another aspect of the invention, the control system 48 may further comprise one or more outputs 88, and the logic system 84 may include an output module (not shown).

As illustrated and described in greater detail hereinafter, the output module may comprise a value source selector adapted to receive messages from the address-based network 30, and a local logic function associated with the value source selector to create a binding, and to provide a signal thereto. One or more outputs 88 may receive an output value from the value source selector based on the signal from the local logic function in order to provide an output signal. The value source selector is adapted to selectively ignore I/O and explicit messages from the address-based network 30 based on the binding, and to selectively use an idle action and set the output value according to an idle value when the local logic function is disabled. Such explicit messages may comprise, for example, configuration information, transferred data, messages to I/O ports, component fault or status information and requests for such, and the like, although it will be appreciated that the invention is not limited to any specific form of such explicit messaging. In addition, the value source selector may selectively use a fault action and set the output value according to a fault value based on an override attribute, and selectively ignore idle messages according to the override attribute.

According to another aspect of the invention, the logic system 84 may further comprise an indicator (not shown) adapted to receive message information from the communications port 82 and providing indicator data, as well as a logic unit receiving message information from the communications port 82, receiving indicator data from the indicator, and performing a logic function. The logic unit may be adapted to selectively provide an output value to one or more of the outputs 88 according to one of the message information and the logic function.

As illustrated and described in greater detail hereinafter, the logic system 84 may be further adapted to execute a stored program and to receive a message from a master device via the communications port 82, wherein the message comprises a parameter (not shown). The logic system 84 is further adapted to execute at least a portion of the stored program according to the parameter and to subsequently suspend execution of the stored program according to the parameter.

Many variations of the exemplary control system 48 may be implemented in accordance with the present invention. For instance, the control system 48 may, but need not, comprise the logic system 84, inputs 86 and outputs 88, whereby the system 48 provides for start/stop and speed control of the motorized roller 38 using the drive controller 80 according to messaging from the network 30 via the communications port 82. In another variation, the control system 48 may comprise the logic system 84, inputs 86, and outputs 88, whereby the system 48 may provide start/stop and speed control of the motorized roller 38 using the drive controller 80 according to messaging from the network 30 or according to programmable logic in the logic system 84. The inputs and outputs 86 and 88, respectively, may thus be employed to perform control and/or interlocking functions in addition to control of the roller 38 and reading of the objects sensor 42.

In another possible variation, the drive controller 80 may comprise various forms of motor control interface, including one or more contactors, soft starters, and variable frequency drives. This variation may or may not include inputs 86 and outputs 88, and may operate the drive controller according to the logic system 84 or according to messaging from the network 30. The invention may thus comprise any number of combinations of local logic, communications, inputs, outputs, and drive controllers, whereby the control system 48 may be advantageously employed in any number of conveyor control applications. In this regard, it will be appreciated that all such variations of the control system 48, including those not specifically illustrated and described herein, are contemplated as falling within the scope of the present invention.

According to another aspect of the invention, the control system 48 may be adapted to advantageously select an output value source for an output device or module (e.g., outputs 88). This aspect of the invention avoids the problems associated with conventional output devices by allowing a user to define one or more attributes associated with the output device (e.g., drive controller 80 and/or outputs 88), as well as to define a binding to local logic (e.g., within the logic system 84). Thus, a user may determine or select the output value source which will be used by the output device under a variety of system conditions, depending on configuration of the output device or module, the current state of the module, and the state of a network.

Figure 8:
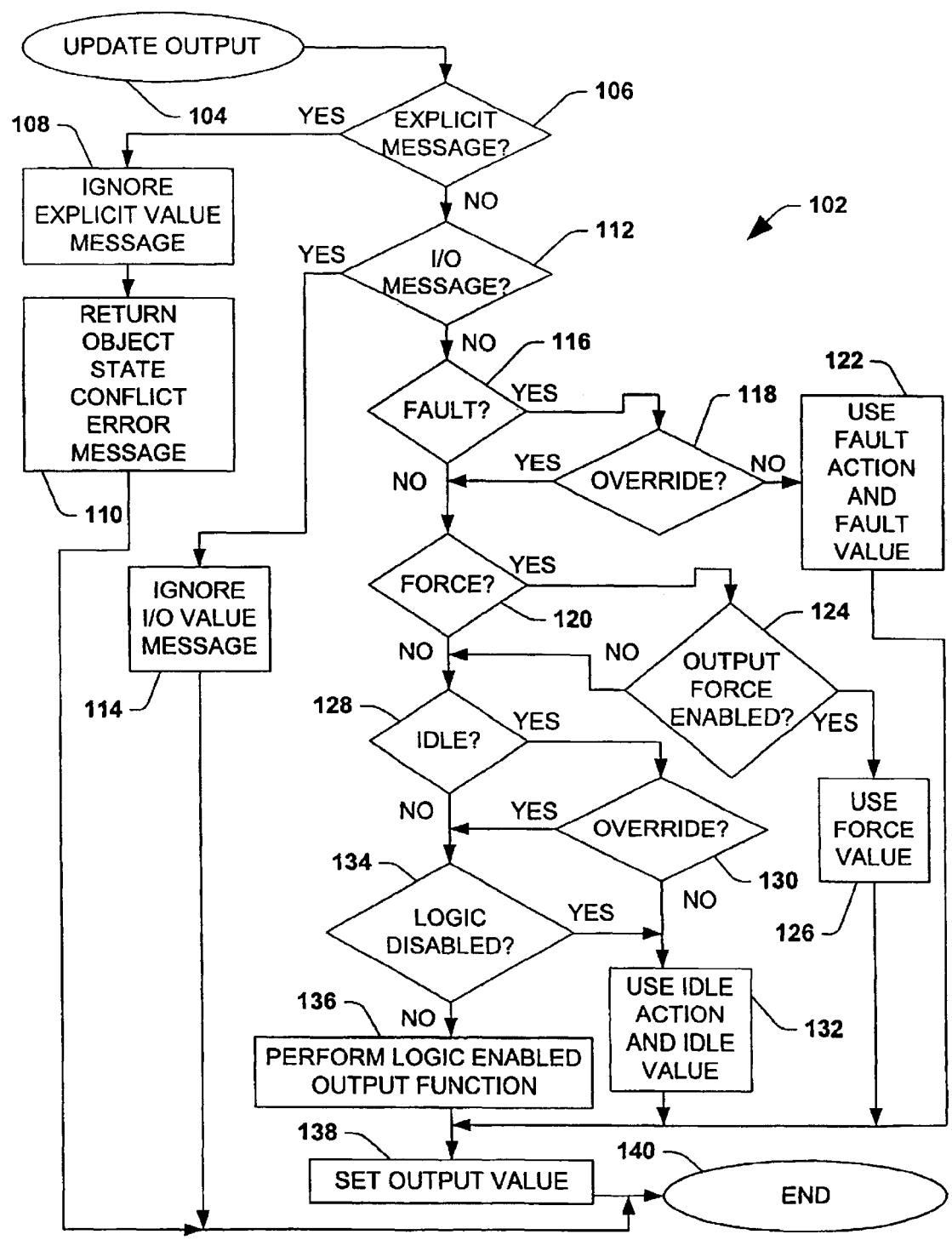
FIG. 8 is a flow diagram schematically illustrating a method for selecting an output value for an output device or module which may be implemented in a conveyor control system in accordance with the invention.

Referring now to the drawings, FIG. 8 illustrates a method 102 of selecting an output value for an output device or module (not shown) according to the invention. The method may be employed in the control system 48 of FIG. 7, for example, in order to select an output value for one or both of the drive controller 80 or the outputs 88. In this regard, the method 102 may be implemented in the logic system 84 of the control system 48. As discussed in greater detail infra, a user may define an association (e.g., a binding) between the output device and a logic function (not shown), which may comprise, for example, local logic. With such an association defined, the output value update begins at step 104, after which the presence of an explicit message is determined at step 106. Explicit messages may be a request to change the output value of the module or device, for example, a configuration request message.

If an explicit message has been received, the message will be ignored at step 108 (e.g., the value in the explicit message will not be used to set the device output value), and an object state conflict error message will be returned at step 110 in response to the explicit message. Since the receipt of explicit messages as well as I/O messages discussed infra, are generally asynchronous to the updating of the output value, the steps 106, 108, and 110, and the processing of I/O messages at steps 112 and 114, are done without performing the set output value step 138. Thus, when an output has been associated with (e.g., bound to) a logic function, it no longer allows explicit messaging services to change its value. Instead, it will return an error indicating an "Object State Conflict".

Decision step 112 determines whether any I/O messages have been received. If so, these are ignored at step 114, since the output device is associated with a logic function. As an example, an I/O message may be sent by a PLC or other device which is running a ladder logic program, in order to update an output device according to the ladder logic. When an output device is bound, it no longer uses the consumed data from an I/O connection (e.g., with a PLC) to update its value. Instead, the source of information that it is bound to will be used.

During a normal update of the device output value, the presence of faults is determined at step 116. When an output is bound and a "Receive Fault" event occurs or a consuming I/O connection times out, the output device may override fault action and fault value settings, based on an override attribute (not shown) at step 118. If the override attribute is set, the method proceeds to step 120. If not, the output value is set according to a fault value at step 122. In this case, the device may also perform a fault action, which may comprise going to a known output value (e.g., the fault value), or holding the last value, etc. The override attribute, fault action, and fault value may be defined by a user via a network tool, as described in greater detail infra.

If no faults are present, or if the override attribute is set, step 120 determines whether a force message has been received. A force message may be generated by a master on a network, which tells an output module to force an output to a specified state, regardless of the I/O state derived from a PLC logic program or from associated local logic. In some conventional systems, this is accomplished by a PLC receiving a force message from the network, and ignoring it's own internal logic, instead sending I/O messages to an output module based on the state specified in the force message. Thus, the output will be set to the state specified in the force message until the module (or PLC) receives another message from the master.

If such a force message has been received, step 124 determines whether the output force feature has been enabled. This feature may be implemented via a force enable attribute (not shown). If the force feature is enabled, the device output value will be set according to a force value at step 126. If no output force message is received, or if the force attribute is not enabled, the method proceeds to step 128, where the presence of an idle message is determined.

When an output is bound and a "Receive Idle" event occurs, the output may override idle action and idle value settings based on the setting of an override attribute (not shown) at step 130, which may be the same override attribute discussed supra with respect to fault override. An example of a receive idle event is where a user switches a PLC or other processor from run mode into a program mode. Where the output is associated with a logic function (e.g., being controlled locally), it is assumed that the I/O connection is not needed for controlling the output's value, and hence the invention provides for selectively ignoring a receive idle event based on the override attribute. If an output is dependent on consumed data, the user can configure the override attribute accordingly. If the override attribute is not set, an idle action and idle value are used at step 132. The idle action may be, for example, to hold the last valid output value, or to go to a known output value, such as the idle value. Otherwise, the method proceeds to decision step 134.

Step 134 determines whether the logic function (e.g., local logic) with which the output device has been associated has been disabled. If so, the idle action and idle value are used at step 132. When an output is bound, it will enter an idle state when local logic is disabled, during which time idle action and idle values will be applied. If the local logic is not disabled, the logic enabled output function is performed at step 136, and the output value is set at step 138 according to the local logic function, after which the value source selection method 102 is completed at step 140. The method illustrated in FIG. 8 thus allows a user many options in selecting an output value source for the output device or module. This provides significant advantages over conventional networked I/O where the output value is controlled by information received from an I/O or explicit messaging service, or in the case of a fault or idle condition, from fault state and idle state attributes, respectively.

Figure 9:
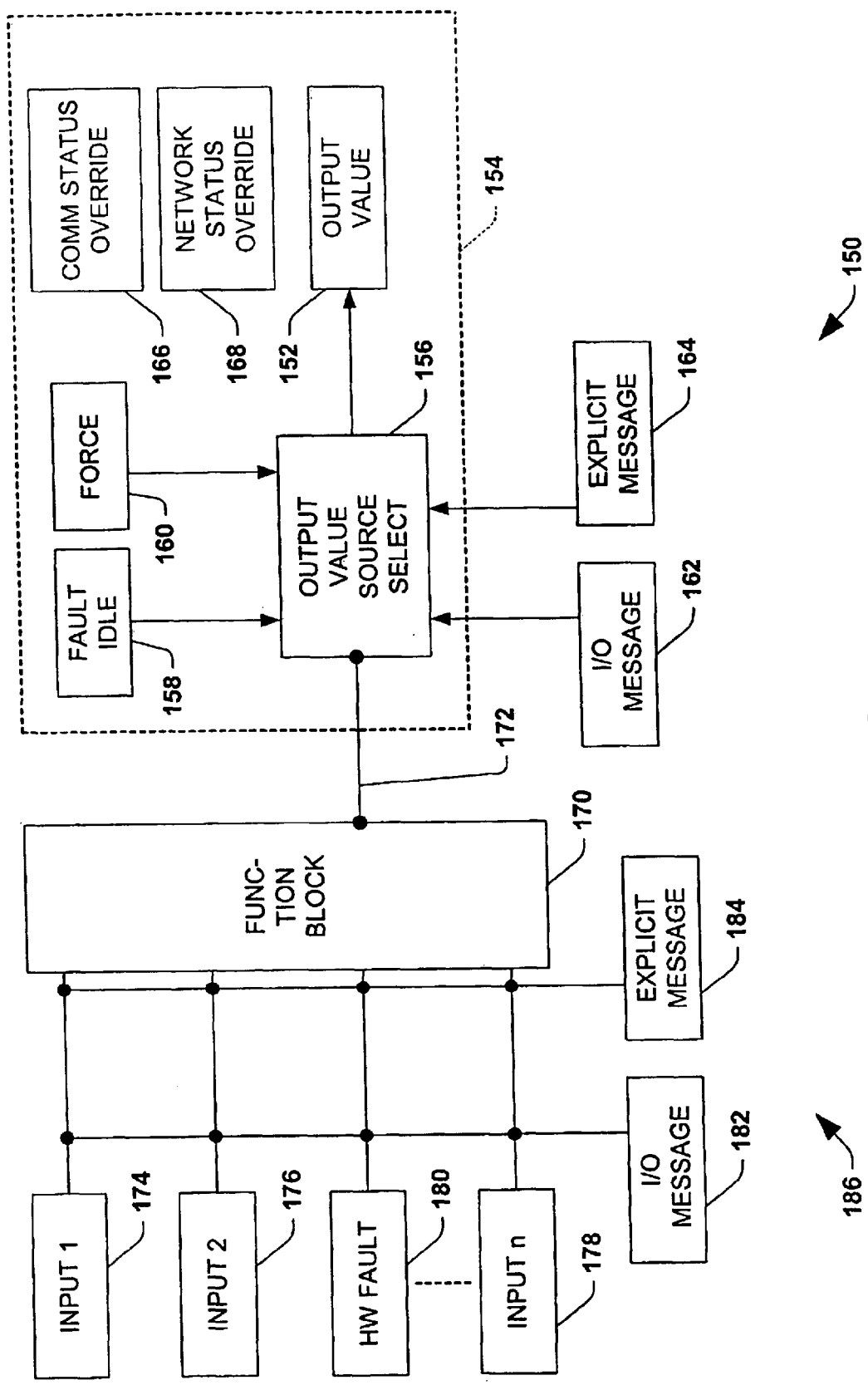
FIG. 9 is a schematic diagram illustrating aspects of an exemplary logic system for selecting an output value for an output device or module in a conveyor control system according to the invention.

Referring now to FIG. 9, a system 150 for selecting an output value 152 for an output device or module 154 is illustrated, wherein the output device 154 comprises an output value source selector 156 for determining the output value 152. The system 9, moreover, may be included in the logic system 84 of the conveyor control system 48. The output value source selector 156 receives external signals from a network or other communications medium (not shown), including a fault/idle message 158, a force message 160, an I/O message 162, and/or an explicit message 164. The device 154 may further comprise communication status and network status override attributes 166 and 168, respectively. The output value source selector 156 may be bound to a function block 170 via a binding 172. Although the exemplary system 150 is illustrated with the output value source selector bound to function block 170, other bindings are possible, such as a binding from the output value source selector 156 to input 2 176. The binding 172 creates an association between the output value source selector 156 and a logic function 186, such as the function block 170, which may include one or more hardware inputs 174, 176, and 178, a hardware fault input 180, I/O messages 182, and/or explicit messages 184. In this regard, outputs may be bound to function blocks, hardware inputs, faults, other outputs, or anything else a developer thinks may be useful in local logic 186.

Once the binding 172 has been made between the local logic 186 and the output value source selector 156 of the output device 154, I/O messages 162 and explicit message 164 will be ignored. Fault and idle conditions 158 may be selectively used or ignored based on the user-defined settings of one or more override attributes including, for example, communication status override attribute 166. The logic function performed by the function block 170 will generally provide a value for the output 152, unless the local logic 186 is disabled. In this case the device 154 enters an idle state, during which time an idle action and idle values (not shown) will be applied, for example, to go to a known value (e.g., the idle value), or to hold the last value.

Figure 10:
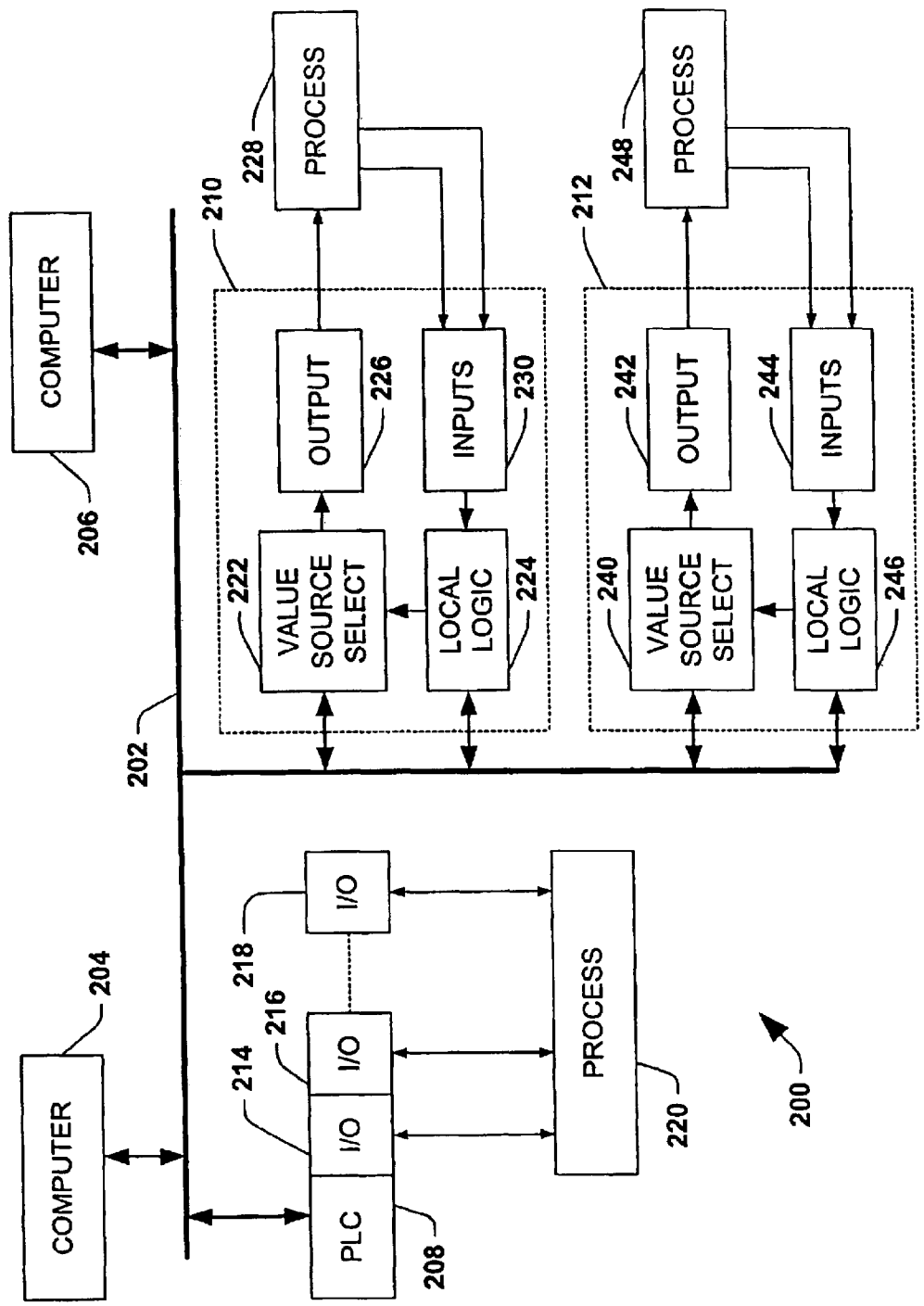
FIG. 10 is a schematic diagram illustrating a control system including the method and system for selecting an output value for an output device or module according to the invention.

Referring now to FIG. 10, a system 200 is illustrated, which includes the method and system for selecting an output value for an output device or module according to the present invention. A communications network 202 is connected between several elements of the system 200, including one or more computers 204 and 206, a programmable logic controller (PLC) 208, and exemplary output modules 210 and 212. Modules 210 and 212 are illustrated as having direct access to the network 202. However, it will be appreciated that the modules 210 and/or 212 may alternatively be connected to a PLC or other processor via a backplane (not shown) with a communications bus (not shown) thereon, with the PLC receiving messages for the module from the network 202. As an example, the PLC 208 may be connected to one or more I/O modules 214, 216, and 218, respectively, which in turn provide outputs to, and/or receive inputs from a process 220.

The exemplary output module 210 comprises a value source selector 222 which may receive messages and/or signals from the network 202 as well as a local logic function 224. An output 226 receives its value from the value source selector 222, and provides an output to a process 228. An inputs unit 230 may measure one or more process variables from the process 228, which may be provided thereby to the local logic function 224. The local logic function 224 may also be adapted to receive and send messages via the network 202. The module 210 may further comprise a processor and a stored control program (not shown) for implementing one or more control strategies to control the process 228. Similarly, the module 212 includes a value source selector 240, an output 242, an input 244, and a local logic function 246 to provide control of a process 248.

According to the invention, the value source selector 222 is adapted to selectively ignore I/O and explicit messages from the network 202 based on the association with the local logic function 224 (e.g., binding), selectively use an idle action (not shown) and set the output value 226 according to an idle value (not shown) when the local logic function 224 is disabled, selectively use a fault action (not shown) and set the output value 226 according to a fault value (not shown) based on an override attribute (not shown), and selectively ignore idle messages from the network 202 according to the override attribute. The module 210 of FIG. 10 thus allows a user many options in selecting an output value source for the output 226. This provides significant advantages over conventional networked I/O where the output value is controlled by information received from an I/O or explicit messaging service, or in the case of a fault or idle condition, from fault state and idle state attributes, respectively.

Figure 11:
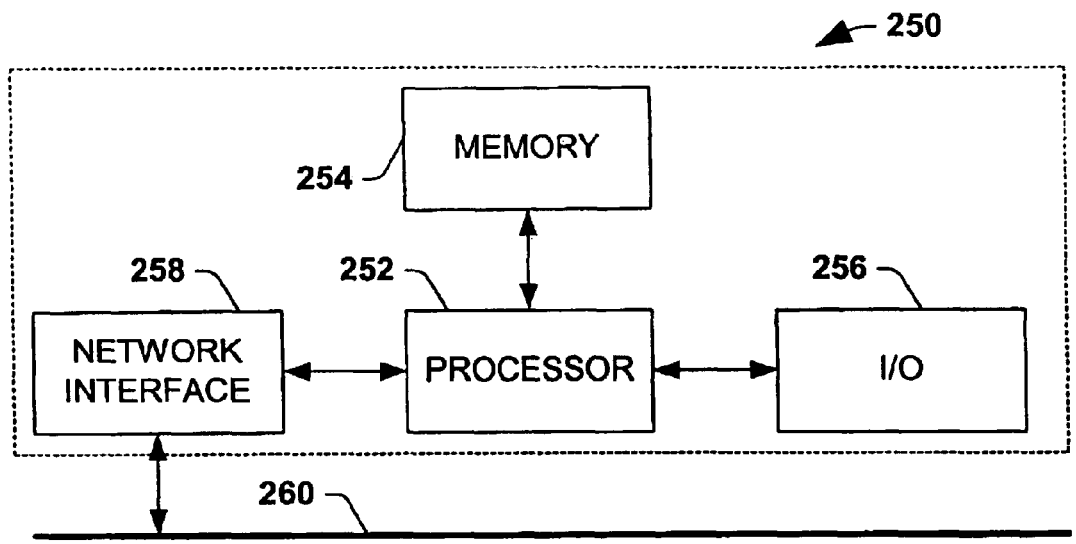
FIG. 11 is a schematic diagram illustrating an output device or module in which the methods and systems of the present invention may be implemented in a modular conveyor system.
Figure 12:
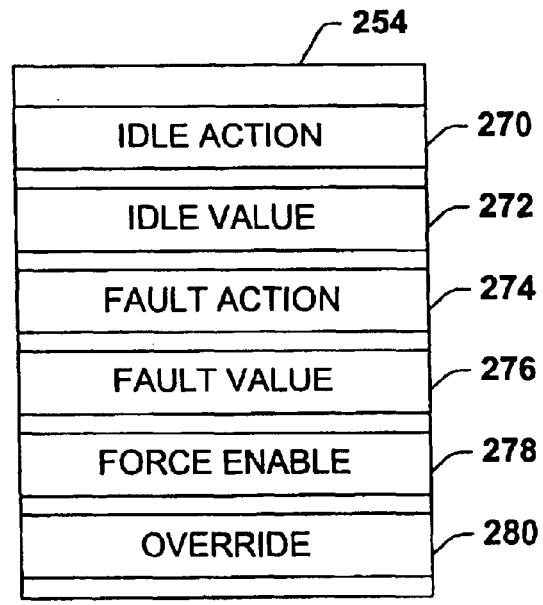
FIG. 12 is a schematic diagram illustrating user-defined attributes in accordance with the invention.

Referring now to FIG. 11, an output device or module 250 is illustrated in which the methods and systems of the present invention may be implemented. The module 250 comprises a processor 252 connected with a memory 254, and I/O section 256, and a network communications interface 258. The interface 258 provides communications between the processor 252 and a communications network 260. In accordance with the invention, an output of the I/O section 256 is associated with (e.g., bound to) a logic function, which may comprise a function block, a hardware input, a fault, and/or an output. The logic function may be implemented in the processor 252 according to a program and/or user-defined attributes stored in the memory 254. Referring also to FIG. 12, the memory 254 may contain one or more user-defined attributes associated with an output value source selector feature of the module 250. The attributes may include an idle action 270, an idle value 272, a fault action 274, a fault value 276, and force enable attribute 278, and one or more override attributes 280. The processor 252 may perform output value source selection according to the invention. These attributes and the various values (e.g., idle value, fault value, etc.) associated with an output device may be user-defined, for example, via a computer or other tool sending messages across the network 260, or even via dipswitches on the output device.

Referring also to FIG. 8, the module 250 may comprise instructions (not shown) in the memory 254 for implementing the output value source selection method 102, by which an output value may be determined by the processor 252 for an output of the I/O section 256. In this regard, the association (e.g., binding) of an output to a logic function allows a user to define where the output will get its output value from, based on the configuration of the module 250, the state of the module 250, and the state of the network 260, as discussed supra with respect to FIGS. 8 and 9. In this regard, the processor or output value source selector 252 may be adapted to selectively ignore I/O and explicit messages from the network 260 based on the association between the output and local logic, selectively use an idle action and set the output value according to an idle value when the local logic function is disabled, selectively use a fault action and set the output value according to a fault value based on an override attribute, and selectively ignore idle messages from the network 260 according to the override attribute.

Another aspect of the invention provides a method and apparatus for providing an output value in an output device, which may be employed in the control system 48 for operation of a conveyor system 10. This aspect of the invention allows a user to define a logic function and to associate the logic function with one or more status/event indicators. The logic function then provides an output value to the device output according to the status/event indicators as well as the logic program. This may determine, for example, whether the output value is based on an I/O message received by the device from a network, or based on the logic. As opposed to conventional conveyor control methods and apparatus, the present invention allows a user to define output device behavior in a variety of circumstances, thereby providing significantly improved design flexibility.

Figure 13:
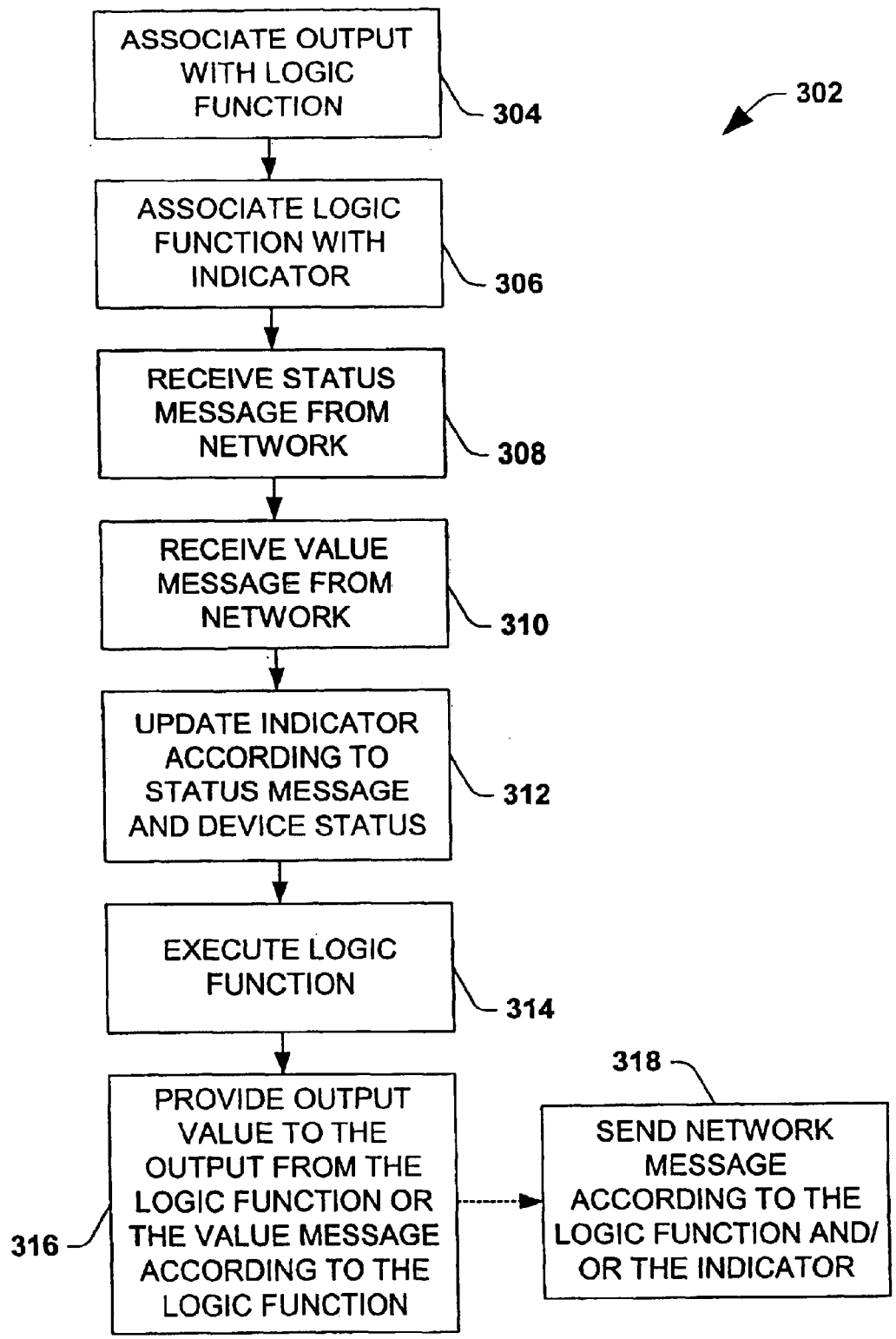
FIG. 13 is a flow diagram illustrating an exemplary method of providing an output value for an output device in a conveyor control system in accordance with the present invention.

FIG. 13 illustrates a method 302 of providing an output value for an output device in a conveyor control system. An output is associated with a logic function at step 304 and the logic function is associated with one or more status/event indicators at step 306. As discussed in greater detail hereinafter, the logic function may comprise one or more function blocks, for example, boolean operators, bi-stable functions (e.g., flip-flops), counters, timers, analog functions, etc. The association of the logic function with the indicator at step 306 may be a logical connection (e.g., a binding) in an output module, which a user may accomplish via a configuration tool through a network, as discussed in greater detail infra. The method also comprises receiving status and value messages from the network at steps 308 and 310, respectively, after which the status/event indicators are updated at step 312 according to information received in the status message and further according to the status of the output device.

It will be appreciated that a single network message may include both value and status information. In this regard, the network message may include indications of the status of various network devices, for instance, network status, devices status of other modules, etc. The message may also include information about the occurrence of various events, such as faults and the like. In this way, the method maintains situation awareness of a variety of status/event conditions in a distributed control system, which may be taken into account in determining an output value for the output module or device.

The status/event indicator may comprise, for example, a list or table in control system memory, whereby a processor in the system may update the information upon receipt of network message, and may access the information in determining an output value in accordance with the user defined logic function. At step 314, the logic function is executed, wherein the associated status/event indications are consulted in determining an output value for the device. Thereafter, the logic function provides an output value to the output at step 316. The logic itself may compute or derive the output value, or the value may be obtained from a network value message (e.g., a typical I/O message), depending on the logic function. Since the logic function itself may be configured to account for one or more of the status/event indications in the indicator, the determination of the output value according to the method 302 provides numerous options for a user in defining the output device behavior. Optionally, a network message may be sent at step 318 according to the logic function and/or the indicator. For example, where an event (e.g., a fault) causes the output value to be derived from the logic function instead of from an I/O message, a user may wish to initiate a network message telling other devices on the network that the output device is changing its control strategy because of the fault.

The method 302, thus allows significantly improved flexibility in defining or configuring distributed conveyor control system elements. The method allows the conveyor control system 48 to be aware of its own situation (e.g., status) as well as the status of other devices on a network and of the occurrence of various events in the system. These indications are associated (e.g., linked or bound) with a user-defined logic function, which accounts for these indications in determining the output value for the device.

Figure 14:
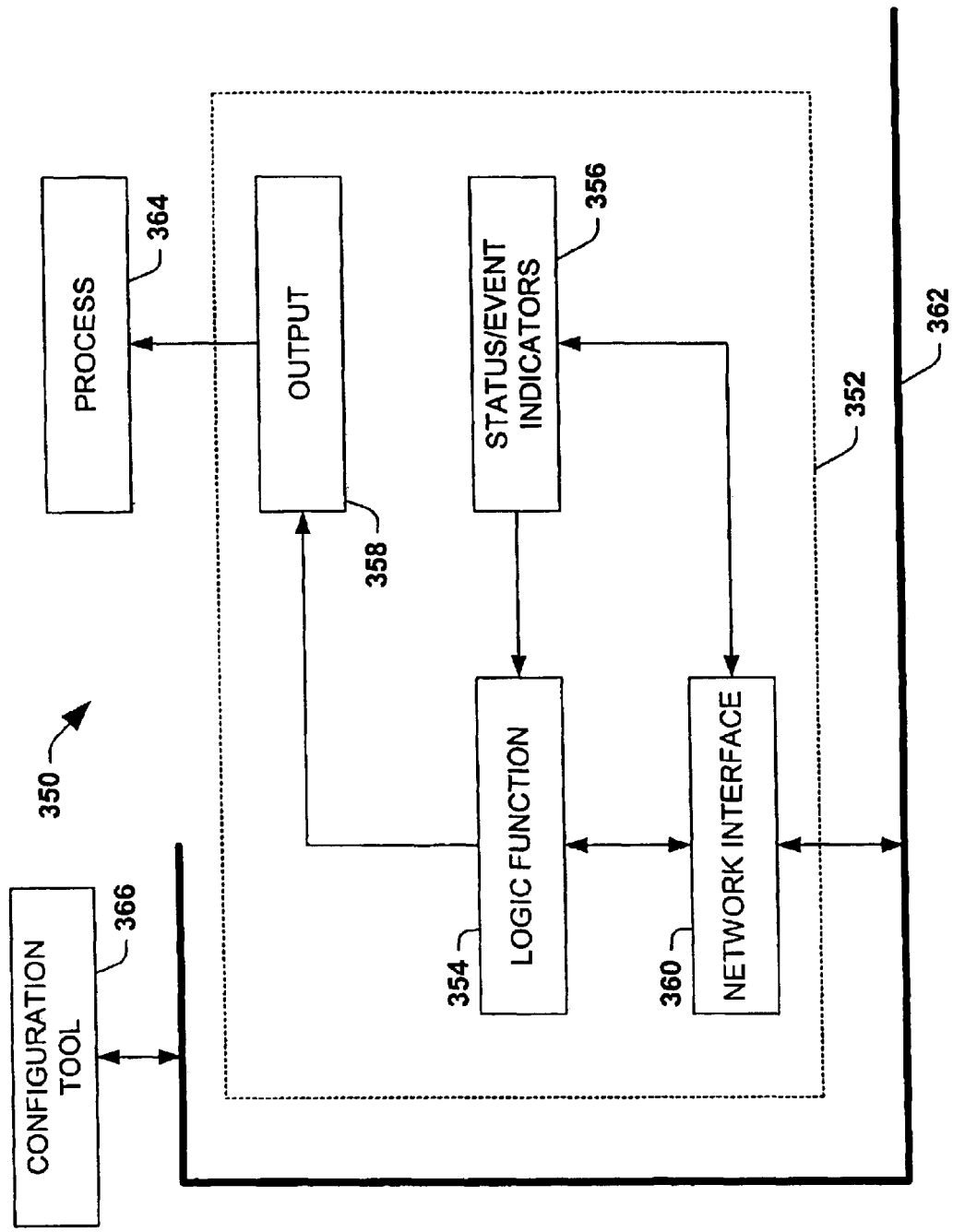
FIG. 14 is a schematic diagram illustrating an exemplary output device for a conveyor control system in accordance with another aspect of the invention.

Referring now to FIG. 14, a system 350 and output device 352 are illustrated, wherein the device 352 is provided with a logic function 354 associated with one or more status/event indicators 356, an output 358, and a network interface 360. The network interface 360 transmits and receives information to and from a network 362, in the form of messages. The messages may be value messages and/or status messages, or the messages may each include both value and status information. The status/event indicators 356 are likewise associated with the network, and thus may receive updated status and/or event information from network messages. The logic function 354 selectively provides an output value to the output 358, which in turn provides an output signal (not shown) to a process 364 (e.g., a conveyor motorized roller). By taking into account the status/event indicators 356, the logic function 354 provides the ability to define the behavior of the output 358 in a variety of situations which was not heretofore possible.

The logic function 354 and the association thereof with the status/event indicators 356 in device 352 may be configured via a configuration tool 66 connected to the network 362. For example, a user may define the logic function 354 in terms of various function blocks (e.g., boolean operators, flip-flops, counters, timers, etc.) and create an association between the logic function 354 and the status/event indicators 356 using the tool 366, which may be a computer, workstation, etc. The configuration (not shown) may then be sent by the configuration tool 366 to the output device 352 via one or more messages on the network 362.

Figure 15:
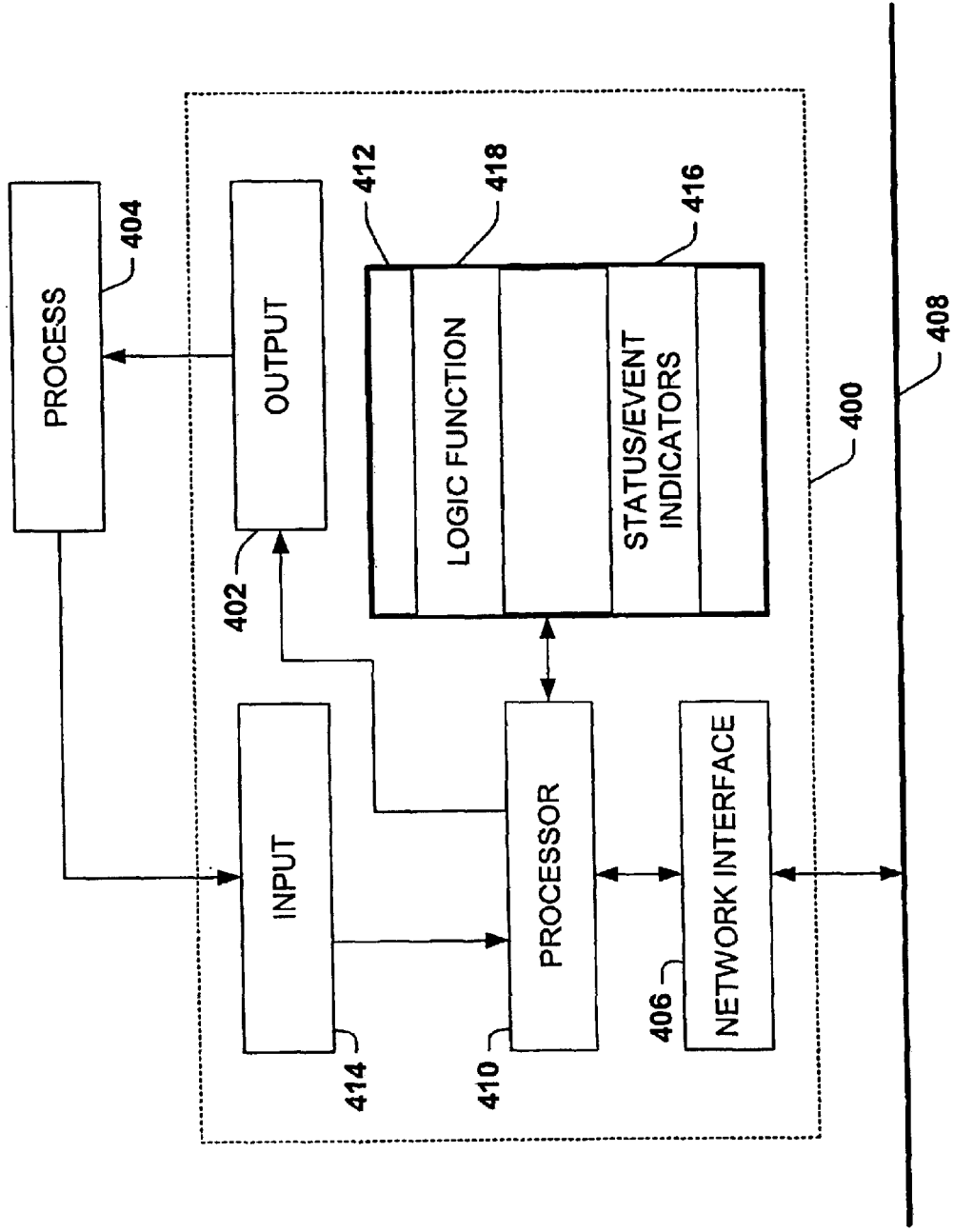
FIG. 15 is a schematic diagram illustrating another exemplary output device in accordance with the invention.

FIG. 15 illustrates further aspects of the present invention, wherein an output device 400 has an output 402 for providing an output signal (not shown) to a process 404, such as a motorized conveyor roller assembly. The device 400 also comprises a communications or network interface 406 providing for transmission and/or receipt of messages to and from a network 408. A processor 410 interfaces with the network interface 406 along with a memory 412 and the output 402. In addition, the device 400 may include one or more inputs 414 for measuring various parameters or variables associated with the process 404. In this regard, the device 400 may be an I/O module, which may be integrated into or otherwise associated with the conveyor control system 48. The network 408 may provide communications between the device 400 and one or more other devices connected thereto, such as computers, workstations, other I/O modules, PLCs, and the like (not shown), in order to form a distributed control system. It will be appreciated that the output device 400 may alternatively be connected to other communications mediums, such as, for example a backplane communications bus, and the like, within the scope of the invention.

In this regard, the output device 400 may receive I/O or other types of messages from a master (e.g., a PLC) via the network 408 (or other communications medium) and the network interface 406. These messages may include value and/or status information which are used to update one or more status/event indicators 416 in the memory 412, and/or to provide an output value to the output 402. A user-defined logic function 418 may also reside in the memory 412 for determining an output value for the output 402 according to one or more of the status/event indicators 416.

According to another aspect of the invention, the logic function may be performed or executed by the processor 410 according to program instructions (not shown) within the memory 412. In addition, the processor may update the status/event indicators 416 in the memory 412 according to messages (not shown) received from other network devices via the network 408 and interface 406. The configuration or definition of the logic function 418 as well as the association thereof with one or more of the status/event indicators 416, may be performed by a user via a configuration tool (not shown) through the network 408 and interface 406. The association between the indicators 416 and the logic function 418 may comprise, for example, a binding or linking, whereby the output value determination takes the indicators into account. As discussed in greater detail infra, the logic function 418 may be defined in terms of one or more function blocks (not shown), whereby a user may configure logical or other functions (e.g., boolean operations, flip-flops, timer, counters, and the like) in order to provide an output value (not shown) to the output 402. The logic function 418 may alternatively be implemented be circuitry or components (not shown) other than the processor 410, which may be adapted to provide an output value to the output 402. The behavior of the output 402 may therefore be defined in a variety of event/status situations, providing the user with significant design flexibility not otherwise possible with conventional devices.

Figure 16:
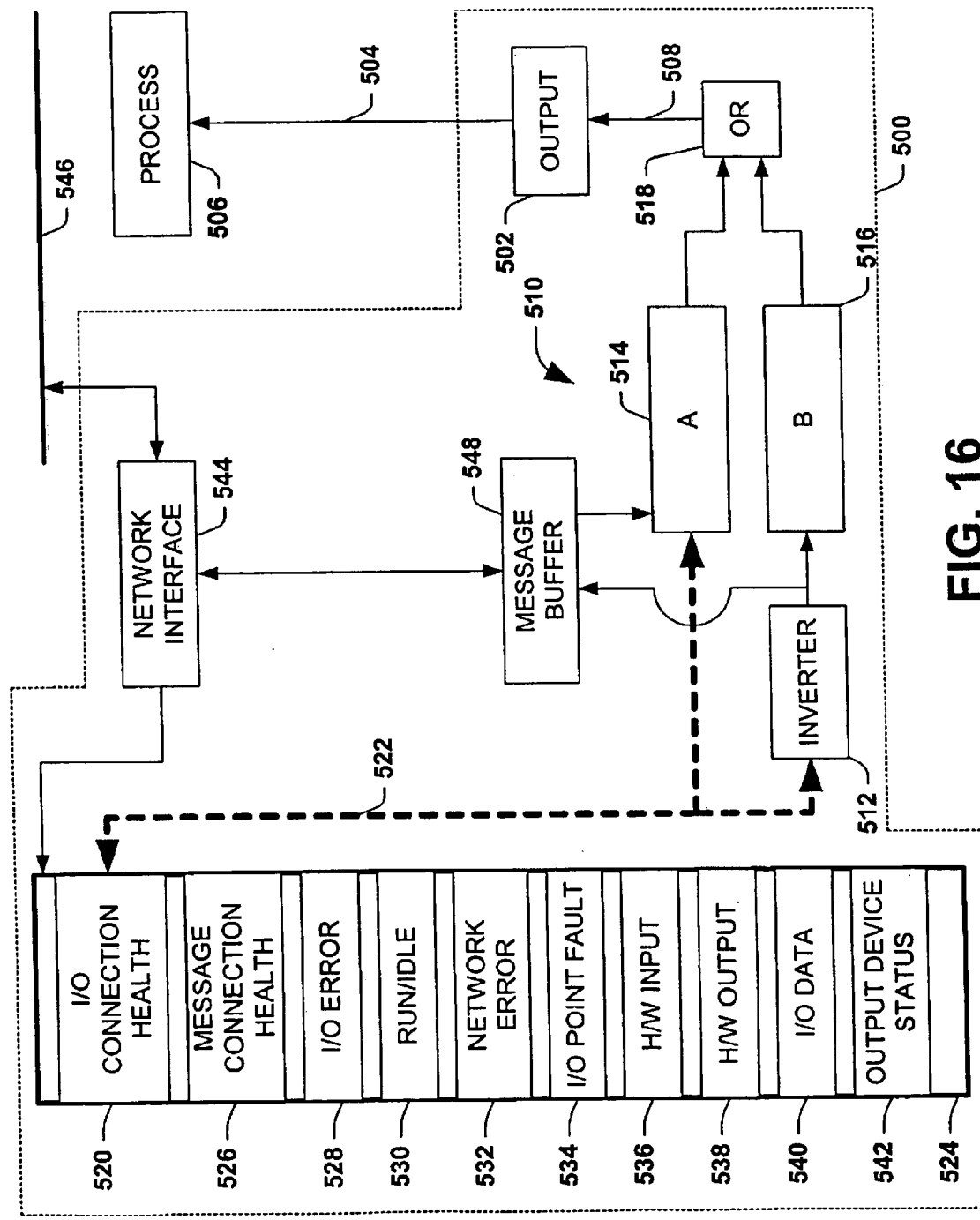
FIG. 16 is a schematic diagram illustrating an exemplary configuration of a conveyor control system output device in accordance with another aspect of the invention.

Referring now to FIG. 16, several aspects of the present invention are illustrated in which an output device 500 comprises an output 502 providing an output signal 504 to a process 506 (e.g., conveyor system 10) according to an output value 508 determined by an exemplary logic function 510. The logic function 510 is illustrated as comprising a logical function block 512 (inverter), a function 514 (A), a function 516 (B), and a function block 518 (OR), with the output of the OR function block 518 providing the output value 508 to the output 502. It will be noted that logic function 510 may comprise function blocks (e.g., 512, 518) as well as other functions (e.g., 514, 516).

The inputs of function block 518 are connected to the outputs of functions 514 and 516. The inverter function block 512 and the function 514, are associated with (e.g., bound to) an I/O connection health status/event indicator 520 via a binding 522, with the inverter function block 512 providing a signal to the input of function 516. The indicator 520 is one element in a status/event indicator table or list 524 which further includes a message connection health indicator 526, an I/O error indicator 528, a run/idle indicator 530, a network error indicator 532, an I/O point fault indicator 534, a hardware input indicator 536, a hardware output indicator 538, an I/O data indicator 540, and an output device status indicator 542. It will be appreciated that the status/event indicator list 524 may comprise any number of indicators related to system and/or module status or event information, and is not limited to those illustrated in FIG. 16.

A network interface 544 provides communication capabilities between the output device 500 and a network 546, and may be operatively connected to the status/event indicator list 524 as well as a message buffer 548. As illustrated, the output device 500 may provide an output value 508 according to the logic function 510, based on one or more entries in the status/event indicator list 524. In this way, the behavior of the output 502 may be defined by a user, taking into account the status of any device in a control system, including the status 542 of the output device 500. In the exemplary configuration of FIG. 16, a safety application is illustrated in which control of the output 502 is switched between the functions A 514 and B 516 depending on the health of an I/O connection from a master (not shown), as indicated by the status/event indicator 520.

If the connection is healthy, function A 514 controls the output, for example, by providing the output value 508 according to an I/O message (not shown) received from the network 546 via the interface 544, and provided to function A 514 of the logic function 510 from the message buffer 548. If the I/O connection with the master is faulted, the I/O connection health indicator 520 in list 524 is updated by the network interface 544, and the binding 522 between indicator 520 and logic function 510 causes function B 516 to provide an output value 508 to the output 502 via the OR function block 518.

The function B 516, for example, may implement a controlled shut down of the process 506 due to the I/O connection health fault associated with the master. In addition, the occurrence of such a fault may be configured by a user to trigger transmission of a message to the network 546 via the message buffer 548 and the network interface 544. This may be accomplished in the definition of the logic function 510 by, for example, linking the output of the inverter function block 512 to the message buffer 548 as illustrated in FIG. 16. In this way, the output device 500 may be configured to perform a controlled shutdown of the process 506 according to the event status indicator 520, and to broadcast a message across the network 546 informing one or more devices thereon that a controlled shutdown of the process 506 is underway.

Many different configurations of functions are possible within the scope of the invention, including those not specifically illustrated in the drawings. In addition, many different functions are possible, including but not limited to boolean operators, flip-flops, counters, timers, analog functions, and the like.

Figure 17:
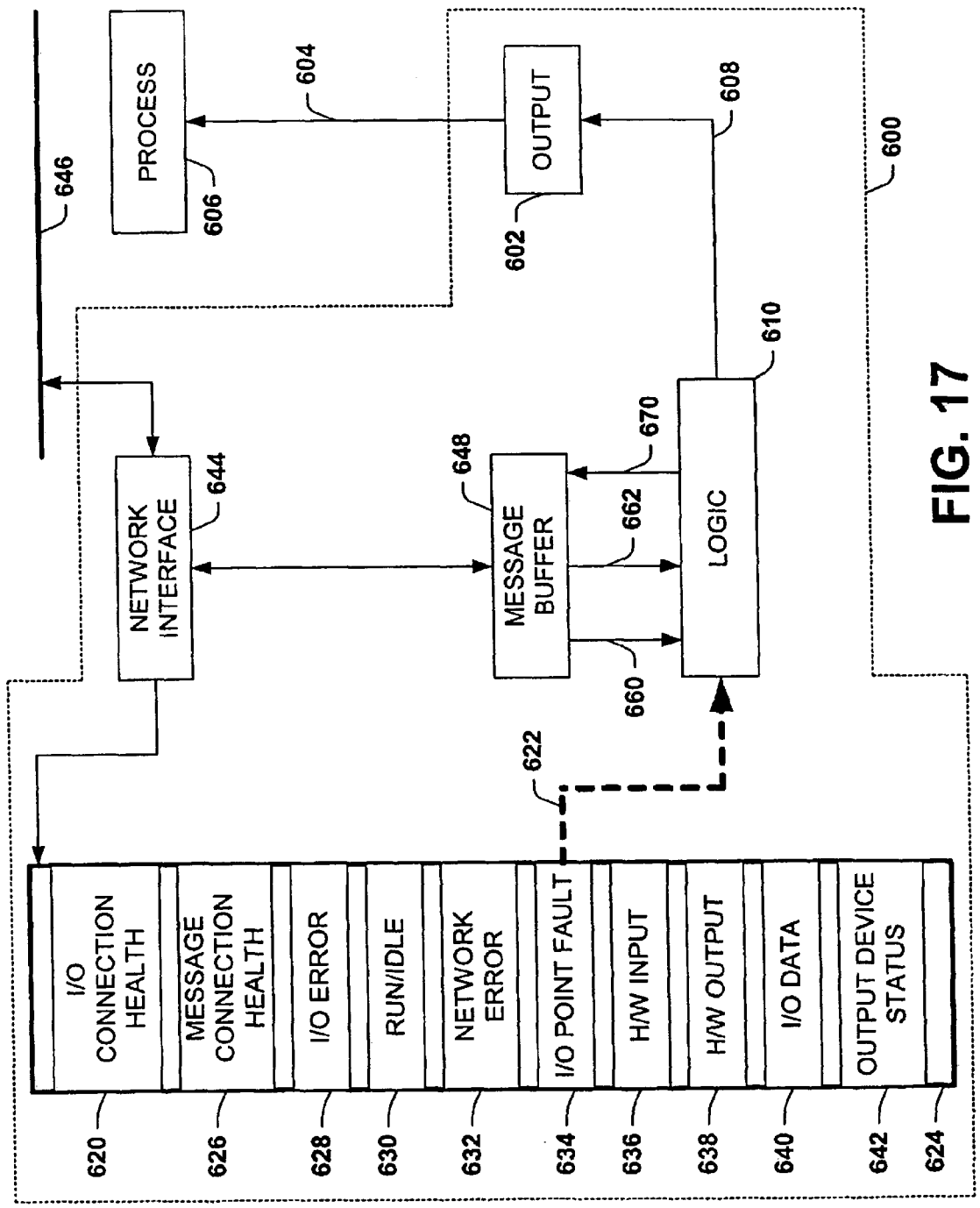
FIG. 17 is a schematic diagram illustrating another exemplary configuration of a conveyor control system output device in accordance with the invention.

Referring now to FIG. 17, another exemplary application of the present invention is illustrated wherein an output device 600 comprises an output 602 providing an output signal 604 to a process 606 according to an output value 608 from a logic unit 610. The logic unit 610 is associated with a list 624 of status/event indicators which comprises an I/O connection health indicator 620, a message connection health indicator 626, an I/O error indicator 628, a run/idle indicator 630, a network error indicator 632, an I/O point fault indicator 634, a hardware input indicator 636, a hardware output indicator 638, an I/O data indicator 640, and an output device status indicator 642. The association between the event/status indicator list 624 and the logic unit 610 comprises a binding 622 which provides an input to the logic unit 610 from the I/O point fault indicator 634. The entries in the status/event indicator list 624 are updated by a network interface 644 according to one or more messages (not shown) from a network 646, which may include, for example, network I/O messages, network status messages, network value messages, etc.

Figure 18:
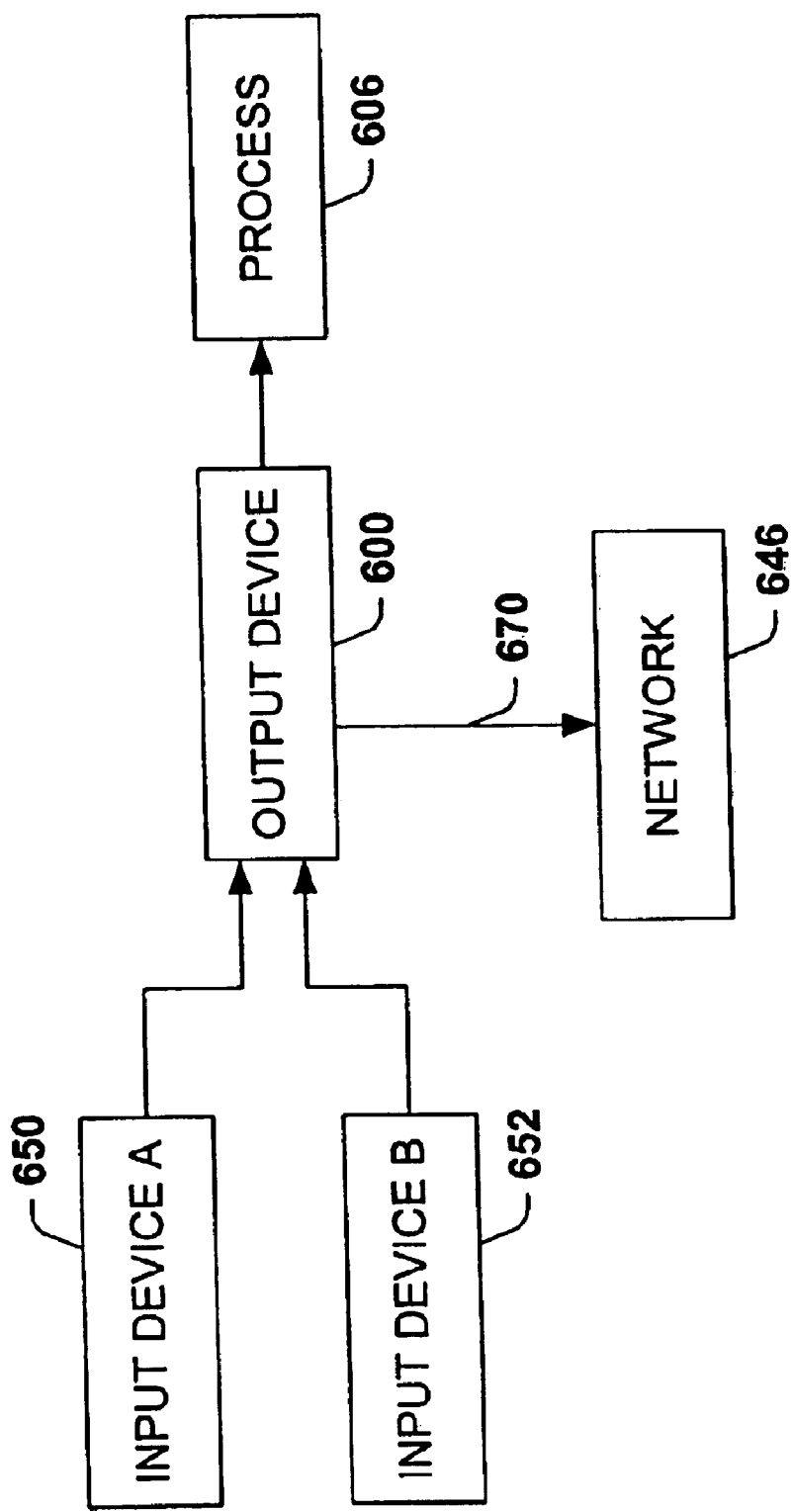
FIG. 18 is a schematic diagram illustrating an exemplary control system including an output device in accordance with the invention.

A message buffer 648 provides for transmission and receipt of network messages from and to the logic unit 610. Referring also to FIG. 18, various aspects of the invention are illustrated in an exemplary redundancy application. In this example, two input devices 650 and 652 feed the output device 600, which provides an output signal 604 to the process 606 based thereon. The output device 600 may receive the values 660 and 662, respectively, of the input devices 650 and 652, for example, from the message buffer 648. This may be the case where one or more separate input modules (not shown) on the network 646 provide the values 660 and/or 662. Where the output device 600 is an I/O module, the inputs may be part of the device 600.

The logic unit 610 of output device 600 compares the two input values 660 and 662 before making any decisions. If one of the input devices 650 or 652 were to fail (e.g., device 652), the output device 600 could continue to operate using only input device 650, according to the user defined configuration of the logic unit 610. The failure of an input in this example may be determined according to the I/O point fault indicator 634. The output device 600 can further be configured to send a message 670 from the logic unit 610 to another device (not shown) on the network 646, via buffer 648 and interface 644, to indicate that a fault has occurred in one of the input devices 650 and/or 652.

Furthermore, the logic unit 600 could be configured to continue operation according to one of the redundant input devices 650 or 652 for a predetermined time period after sending the message. In this case, the message 670 could include information that an input device has failed, and the output device 600 will continue to operate according to a single remaining input device for a specified time period. After the time period has expired, the logic unit 610 may be configured, for example, to perform a controlled shut down of the process 606. The output device 600 can thus notify a master controller (e.g., a PLC on the network 646), via message 670, that input device 652 has failed, and that operation with device 650 will continue for a configurable time period. This allows, for example, time for the failed device to be replaced without stopping the process.

It will be appreciated that many configurations and output device behaviors are possible according to the invention, and that the invention is not limited to those illustrated and described herein. For instance, many different logical functions may be implemented by configuring one or more logical function blocks with associations to one or more status/event indicators. In this regard, the function blocks may be boolean operators, flip-flops, counters, timers, etc., and may also include analog functions within the scope of the present invention.

Another aspect of the invention provides a system and methodology by which a user can perform single step and/or time sliced operation of one or more control systems 48 devices in a distributed conveyor system (e.g., system 10). The user may then perform system diagnostics, for example, by interrogating certain control systems 48 to obtain status information, output and input values, and the like. The system may then be further iterated and the method repeated, thus allowing the identification of logic programming and/or hardware problems in a system. The system and methodology of the present invention thereby provides for significantly improved diagnostic and troubleshooting capabilities over conventional conveyor control systems.

Figure 19:
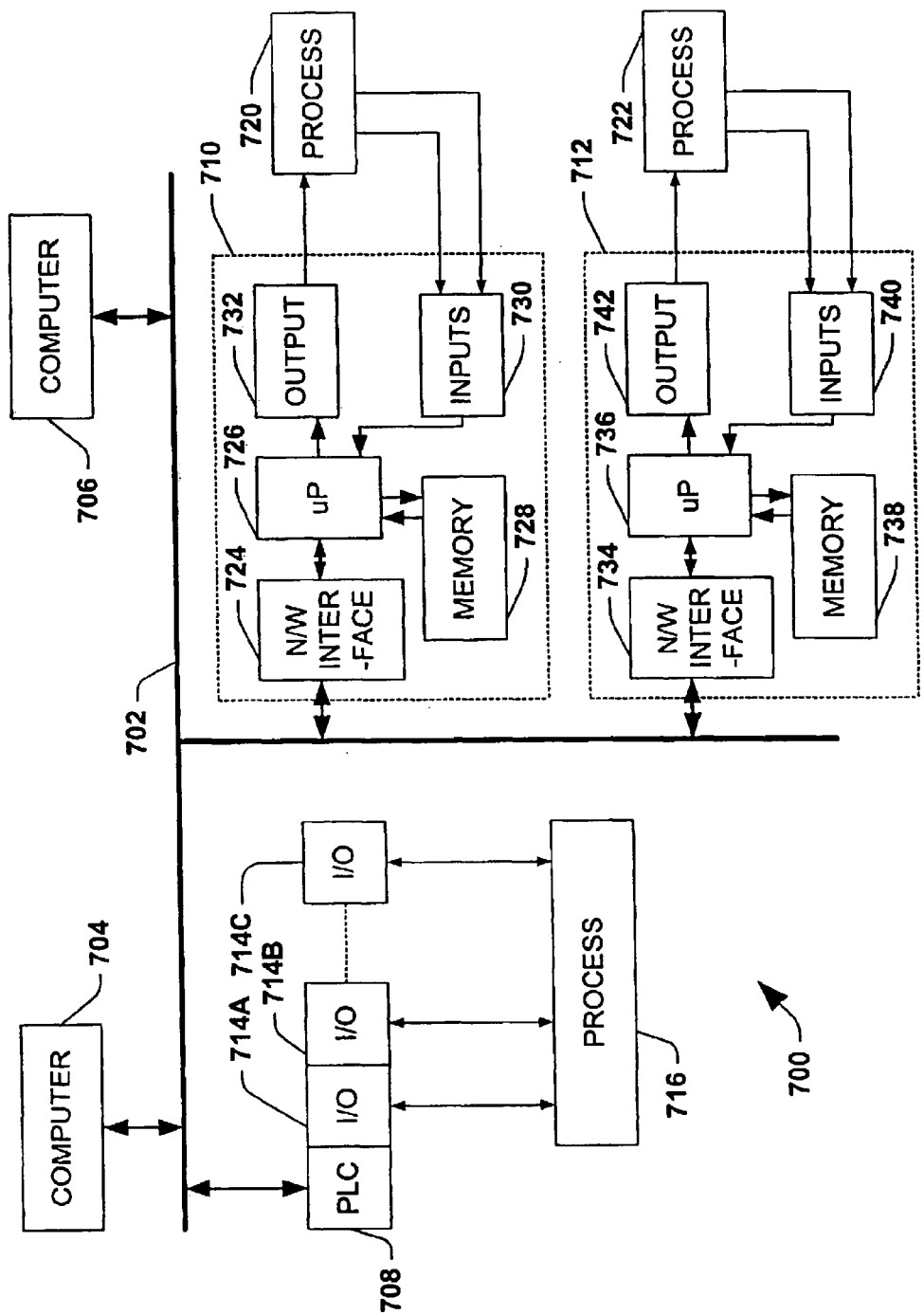
FIG. 19 is a schematic block diagram illustrating an exemplary distributed conveyor control system in which various aspects of the present invention may be implemented.

Referring now to FIG. 19, an exemplary distributed control system 100 is illustrated in which various aspects of the present invention may be implemented. The system 700 includes a network 702 interconnecting computers 704, 706, PLC 708, and control devices 710 and 712 for communication therebetween. The PLC 708 may be installed in a rack (not shown) along with one or more I/O modules 714A, 714B, and 714C, by which the PLC may communicate with the modules (hereinafter collectively referred to as 714) via a bus or other communications medium (not shown). In this manner, the PLC 708 may control a process 716 via the I/O modules 714, which may or may not directly communicate with the network 702.

The control devices 710 and 712 may be controllers, smart I/O modules, and/or conveyor control systems, respectively, for controlling and/or interfacing with processes 720 and 722, respectively (e.g., conveyor zones 36). Device 710 comprises a network interface 724 providing communications between a microprocessor 726 and the network 702. Microprocessor 726 is further connected to a memory 728, an input stage 730, and an output 732. The memory 728 may store a control program (not shown) and data related to the process 720, for example, an I/O table (not shown). The input stage 730 and the output 732 provide interfaces between the device 710 and the process 720. Similarly, device 712 comprises a network interface 734 providing communications between a microprocessor 736 and the network 702. Microprocessor 736 is further connected to a memory 738, an input stage 740, and an output 742. The input stage 740 and the output 742 provide interfaces between the device 712 and the process 722.

In accordance with the present invention, the devices 710 and/or 712 may receive a message (not shown) from the network communications medium 702, wherein the message includes a parameter, execute at least a portion of the stored control program (not shown) according to the message parameter, and subsequently suspend or stop execution of the stored program according to the parameter. The message may put the devices 710 and/or 712 into a step mode, or may cause execution of at least a portion of the program in the devices 710 and/or 712, which is already in a step mode by virtue of, for example, a previous mode change message. The invention thus allows a user to begin execution of a control device program or internal logic for a limited or specified time period or number of logic iterations, after which the devices 710 and/or 712 will suspend execution.

Figure 20:
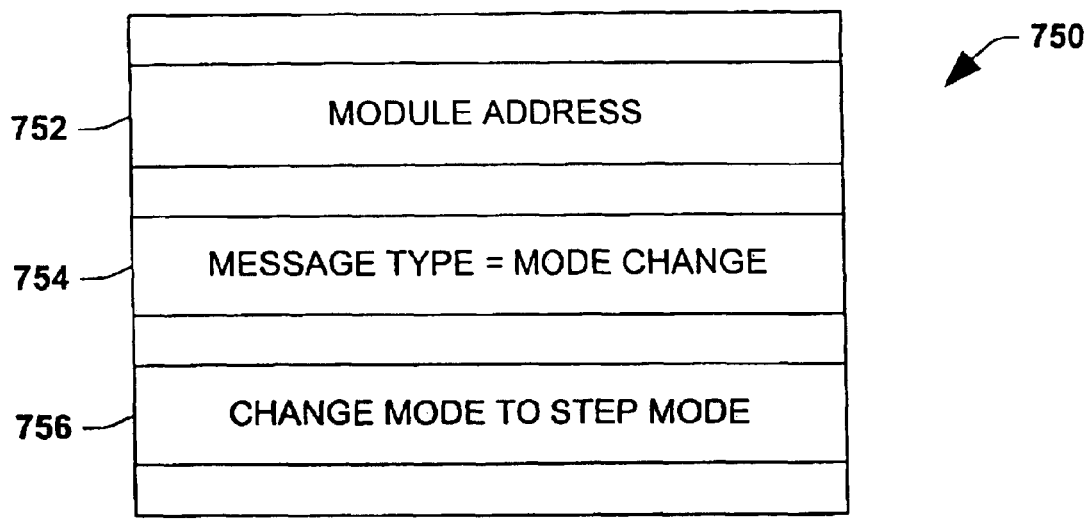
FIG. 20 is a block diagram illustrating an exemplary mode change message in accordance with the invention.

Referring also to FIG. 20, an exemplary mode change message 750 in accordance with the invention is illustrated having a module address field 752, a message type field 754, and an instruction field 756 instructing the recipient control device (e.g., devices 710 and/or 712) to change mode to step mode. Following receipt of a mode change message 750, the devices 710 and/or 712 may suspend execution of their respective stored control programs (not shown) and await another mode change message or a step command message as described in greater detail infra. As is understood in the art, the microprocessors 726 and 736 of devices 710 and 712, respectively, receive messages from the network 702 via the network interfaces 724 and 734, respectively.

Figure 21:
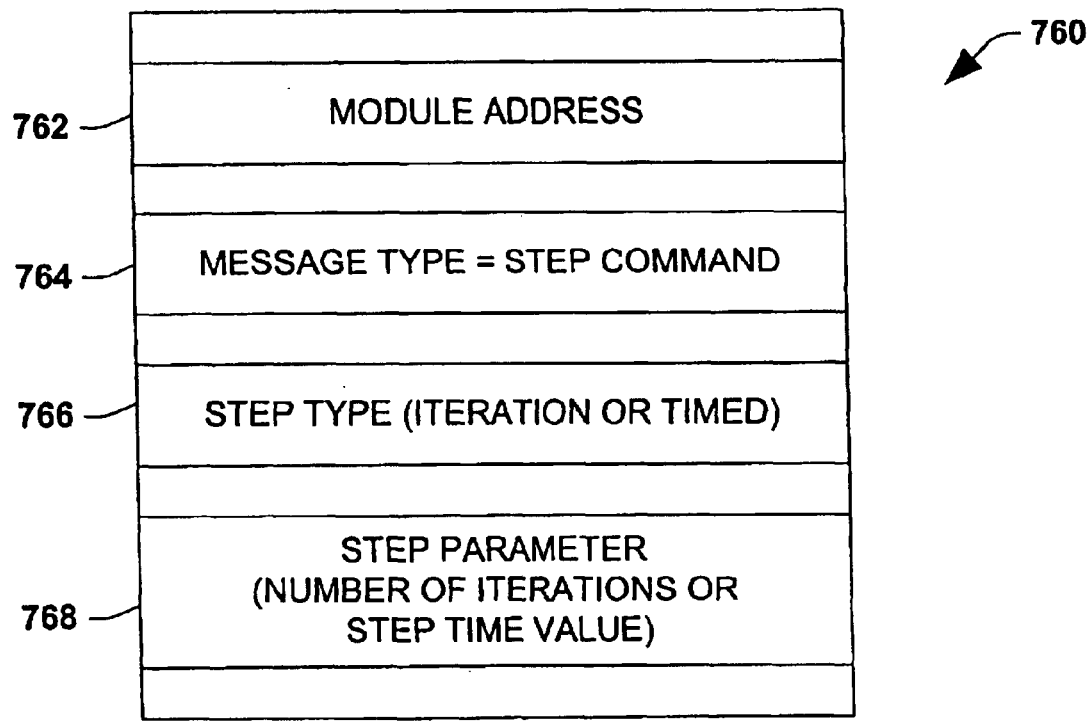
FIG. 21 is a block diagram illustrating an exemplary step command message in accordance with the invention.

FIG. 21 illustrates an exemplary step command message 760 in accordance with the invention, which comprises a module address 762, a message type field 764 indicating the type as a step command, a step type 766, and a step parameter 768. The step type 766 may comprise, for example, an indication of whether the desired step is a timed step or an iteration step. The corresponding step parameter 768 may comprise, for example, a number of iterations or a step time value, depending on the step type 766. As described in greater detail hereinafter, one or more control devices (e.g., devices 710 and/or 712) may execute a portion of their respective stored control programs (not shown) according to the step type 766 and the step parameter 768 upon receipt of the message 760 via the network 702 or other communications medium.

Figure 22:
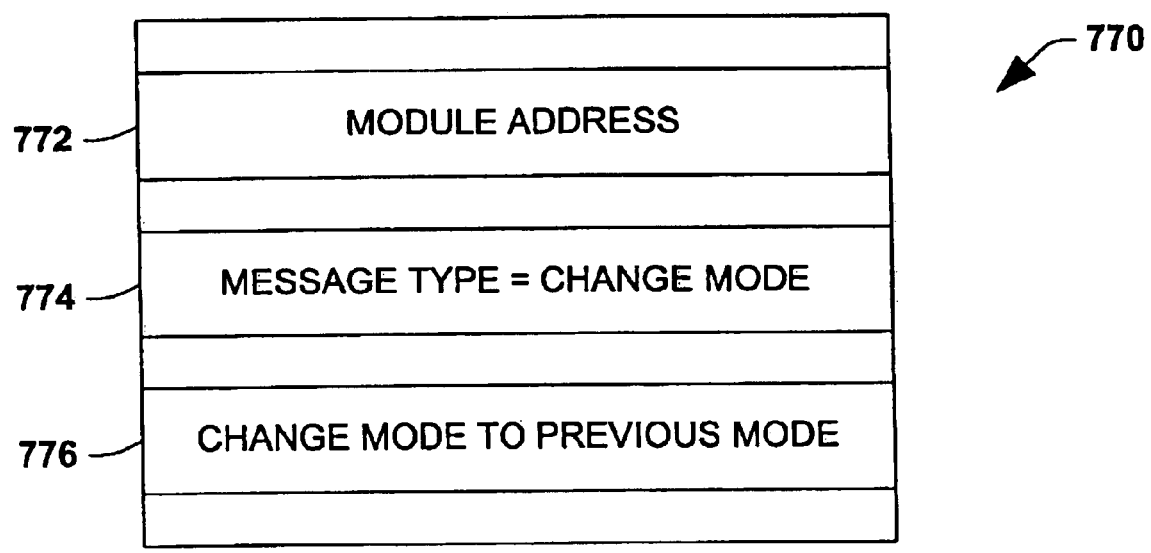
FIG. 22 is a block diagram illustrating another exemplary mode change message in accordance with the invention.

Referring now to FIG. 22, another exemplary mode change message 770 is illustrated having a module address field 772, a message type field 774, and an instruction field 776 instructing the recipient control device (e.g., devices 710 and/or 712) to change mode to the previous mode. Following receipt of such a mode change message 770, the devices 710 and/or 712 may return to execute mode and resume execution of their respective stored programs (not shown) after being in the step mode.

Figure 23:
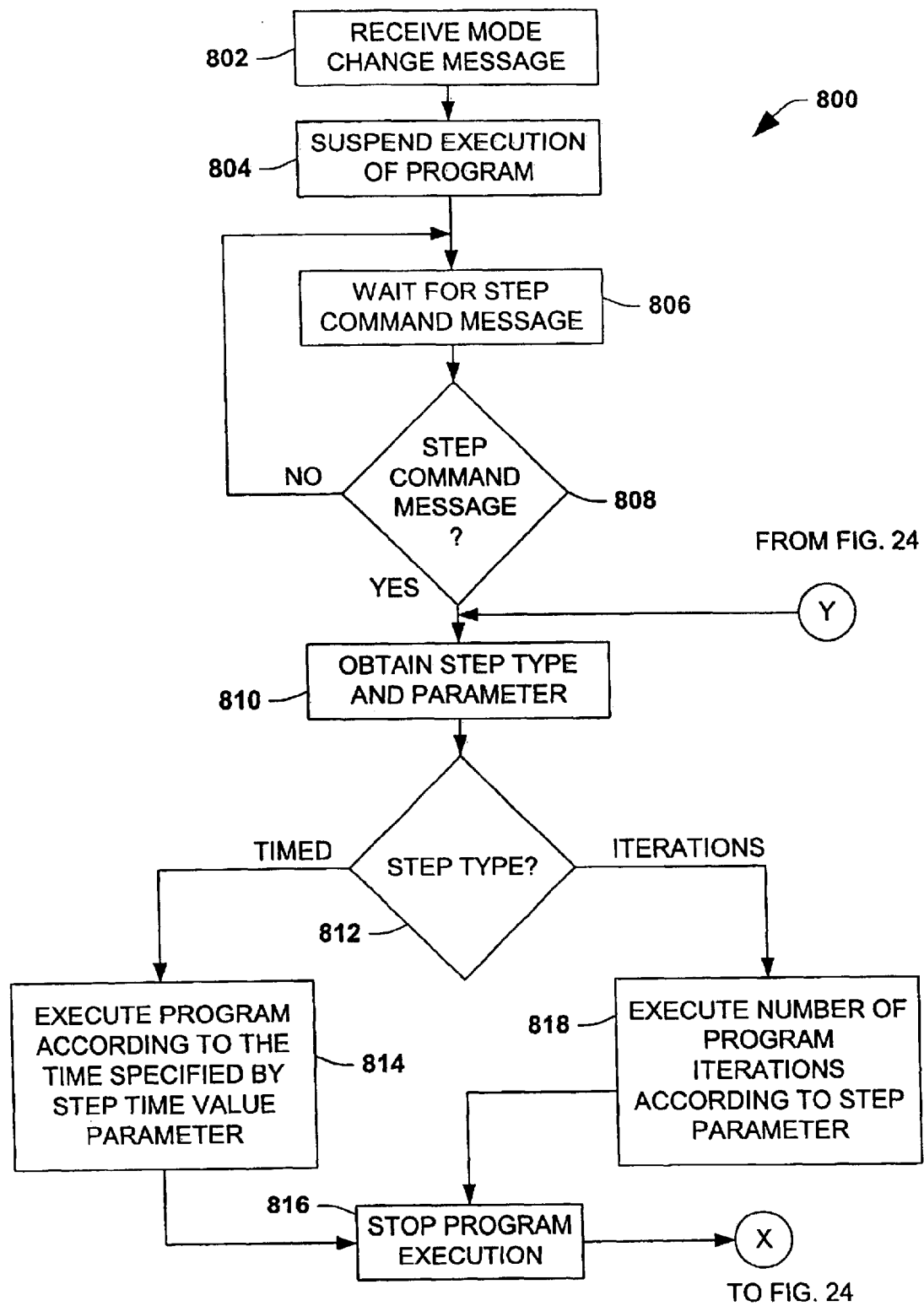
FIG. 23 is a flow diagram illustrating an exemplary method of performing a function in a conveyor control system in accordance with the invention.
Figure 24:
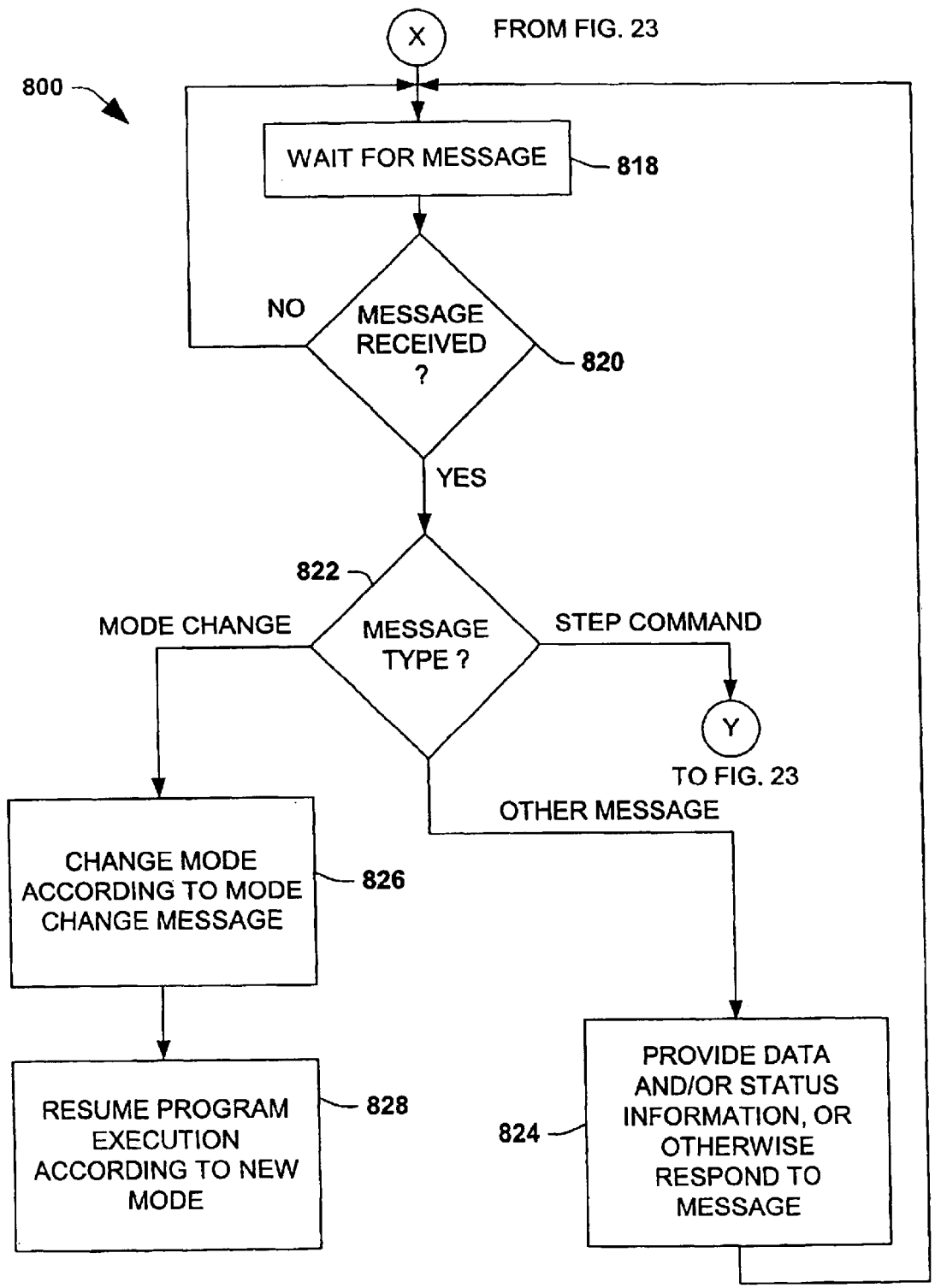
FIG. 24 is a flow diagram illustrating further aspects of the method of FIG. 23.

FIGS. 23 and 24 illustrate an exemplary method 800 of performing a function in a control system in accordance with the present invention. The method 800 begins at step 802 where a mode change message (e.g., message 750 of FIG. 20) is received, after which program execution is suspended or stopped at step 804. Thereafter, the device waits for a step command message at steps 806 and 808. As will be appreciated from the discussion of FIGS. 27 through 29 infra, a single message may comprise both a mode change command and a step command in accordance with the invention. It will be further appreciated that messages other than step command type messages may be received at this point (e.g., I/O messages, other mode change messages, etc.), which may be operated on and/or responded to accordingly. However, for the sake of brevity, the method 800 is illustrated in FIG. 23 as waiting for a step command message via steps 806 and 808.

Once a step command has been received, the step type and parameter are obtained therefrom at step 810. Decision step 812 then determines whether the step type is timed or iterations. If the step type is timed step, the device (e.g., device 710 and/or 712) executes its stored control program according to the time specified by the step time value parameter at step 814 before program execution is suspended or stopped at step 816. Alternatively, if the step type is iterations at step 812, the device executes the number of program iterations according to the step parameter at step 818 before program execution is stopped or suspended at step 816.

Referring also to FIG. 24, once program execution has been stopped or suspended at step 816, the control device waits for receipt of another message at steps 818 and 820. Once a message has been received from the communications medium (e.g., network 702), the message type is determined at decision step 822. If the message is a step command, the device obtains the step type and parameter from the message at step 810 of FIG. 23 as discussed supra.

If the new message is not a step command or mode change type message (e.g., I/O or other explicit message), the device provides data and/or status information, or otherwise responds to the message at step 824, before returning to step 818 to await another message. In this regard, data may be provided by a device such as device 710 of FIG. 19, via a message (not shown) on the network 702 to a device (e.g., computer 704) which requested the data. In this manner, a user may generate step messages from a computer 704, and when the device 710 has completed step mode execution and stopped, data values and/or status information may be obtained from the device 710 via I/O or other explicit messaging. Returning to FIG. 24, if the new message is a mode change message, the device will change mode according to the new mode change message at step 826 and resume program execution according to the new mode at step 828.

Figure 25:
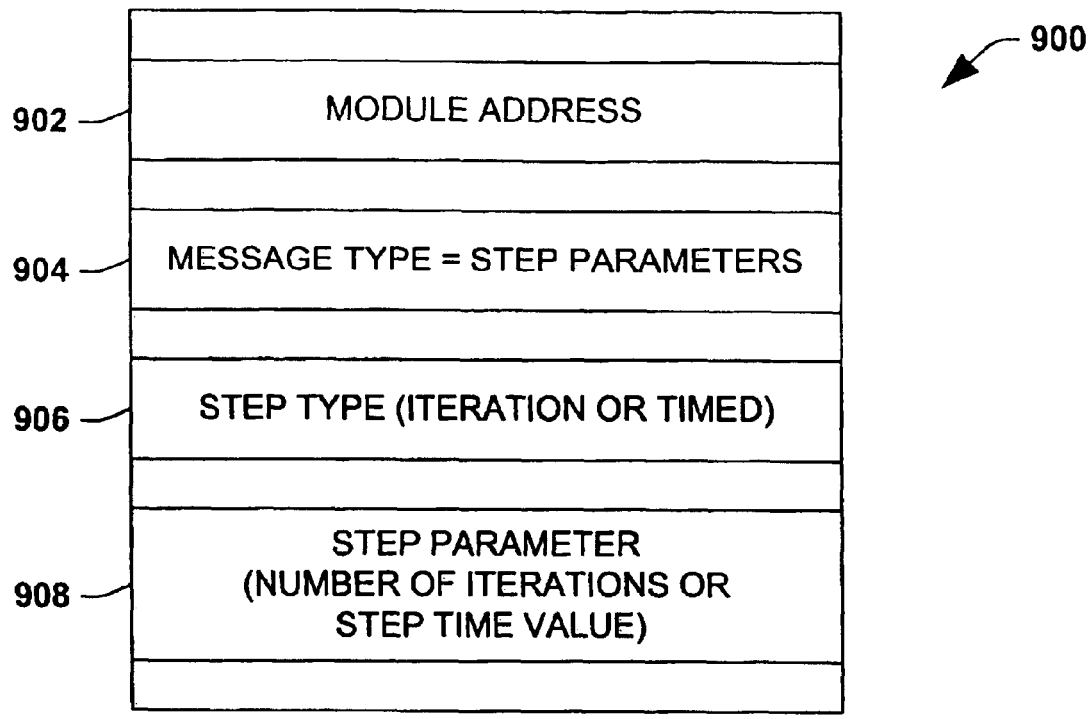
FIG. 25 is a block diagram illustrating an exemplary step parameter message in accordance with the invention.

In accordance with another aspect of the invention, step parameters may be provided to a distributed control device in a separate message. Referring now to FIG. 25, an exemplary step parameter message 900 is illustrated, having a module address 902, a message type 904 indicating a step parameter message, a step type 906 indicating iteration or timed step as described supra, and a step parameter 908 corresponding with the step type 906 and indicating a number of iterations or a step time value, respectively. This form of message provides step parameters to a device (e.g., device 710 and/or 712), for example, where a prior mode change message (e.g., message 750 of FIG. 20) has placed a control device (e.g., device 710 and/or 712 of FIG. 19) into step mode.

Figure 26:
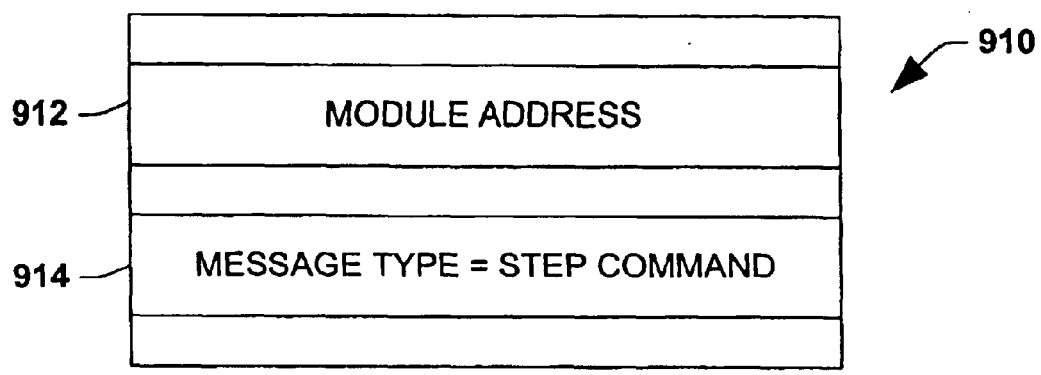
FIG. 26 is a block diagram illustrating another exemplary step command message in accordance with the invention.

Referring also to FIG. 26, another exemplary step command message 910 is illustrated having a module address 912 and a step command message type 914. This message may be used to initiate a step of a device in accordance with the invention, where, for example, the device has been provided with a step type 906 and a step parameter 908 via a previous step parameter message 900 such as that illustrated in FIG. 25 and described supra. Many different message protocols are possible, including those not specifically illustrated in the figures, which fall within the scope of the present invention.

Figure 27:
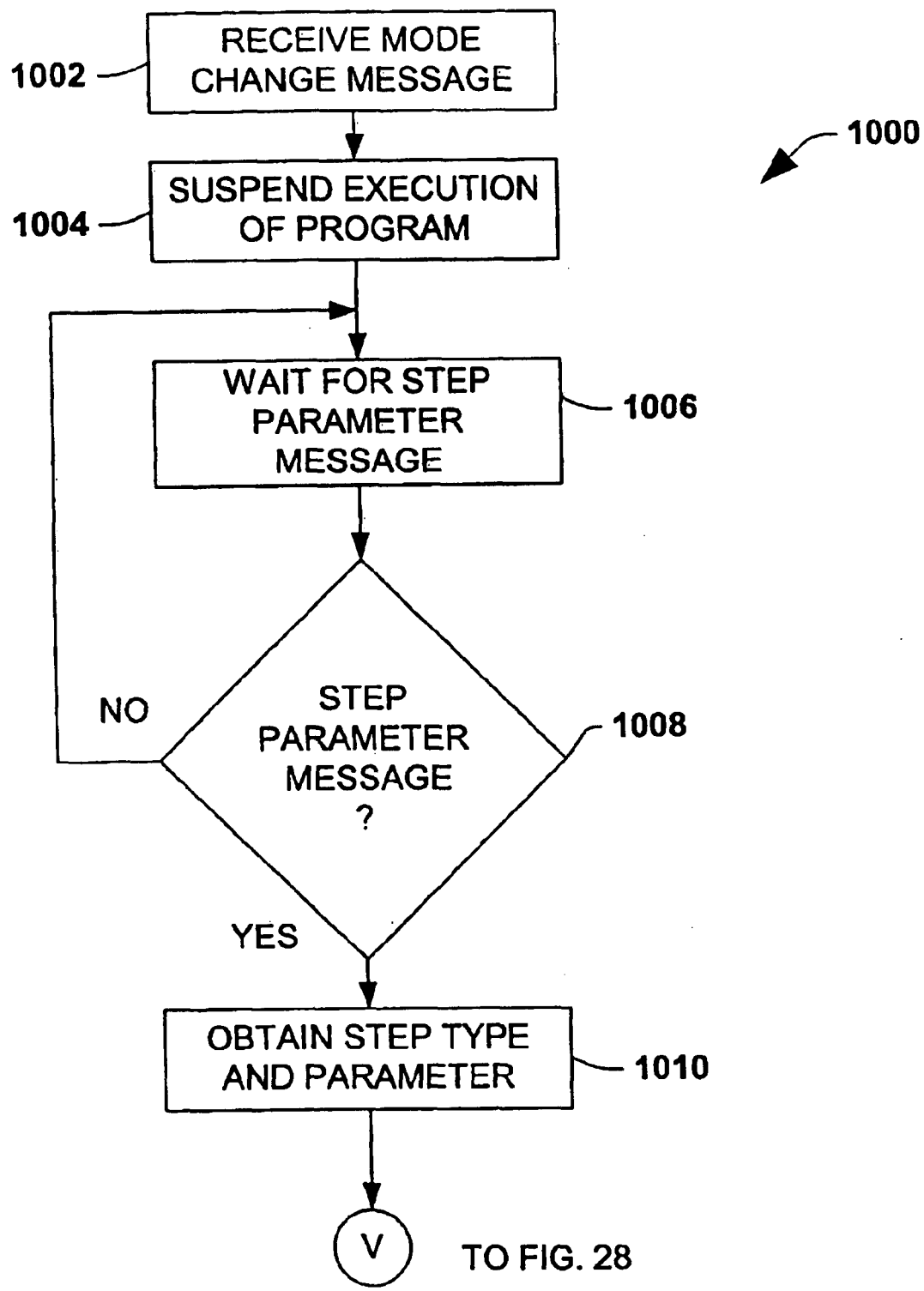
FIG. 27 is a flow diagram illustrating another exemplary method of performing a function in a conveyor control system in accordance with the invention.
Figure 28:
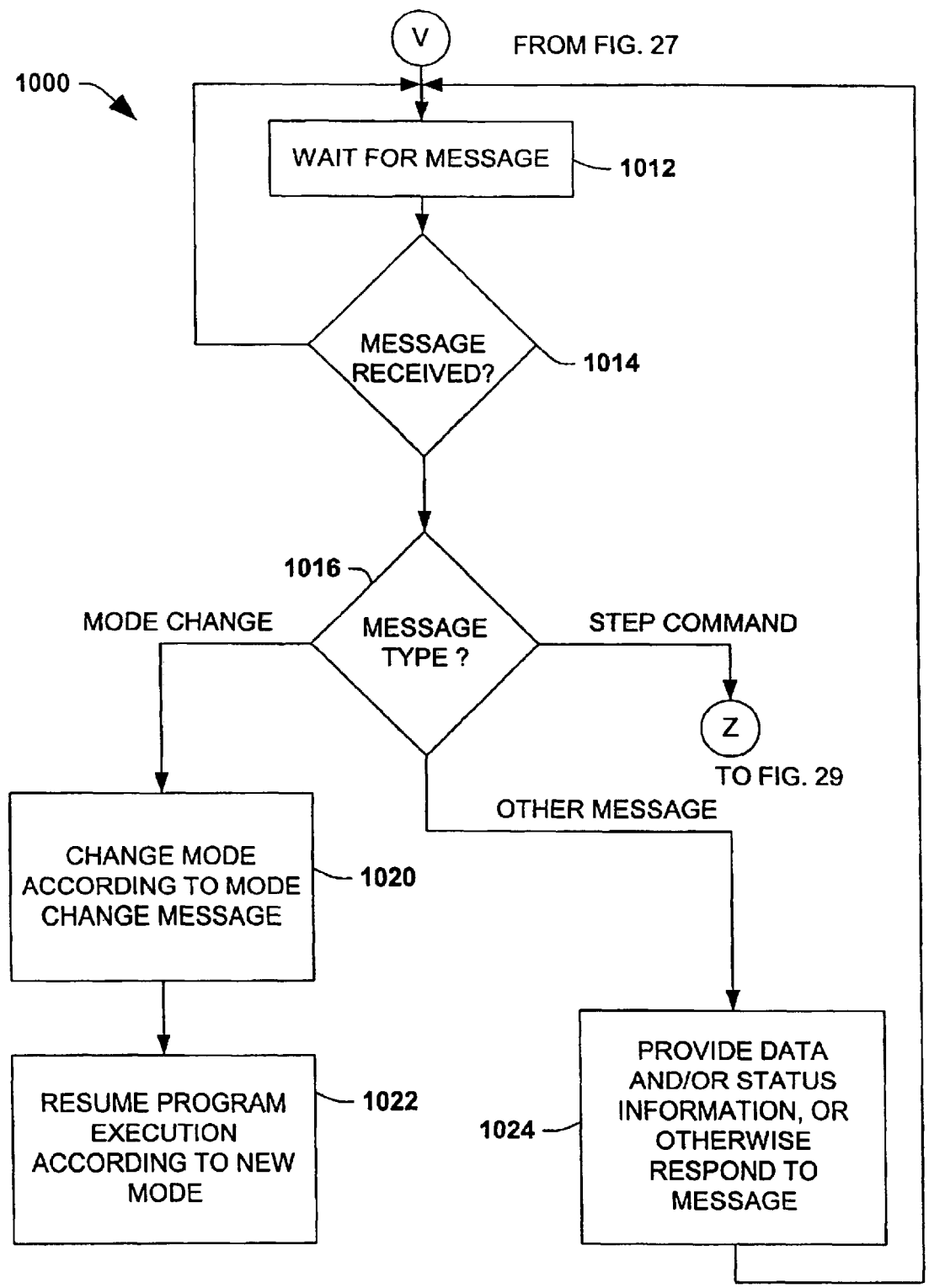
FIG. 28 is a flow diagram illustrating further aspects of the method of FIG. 27.
Figure 29:
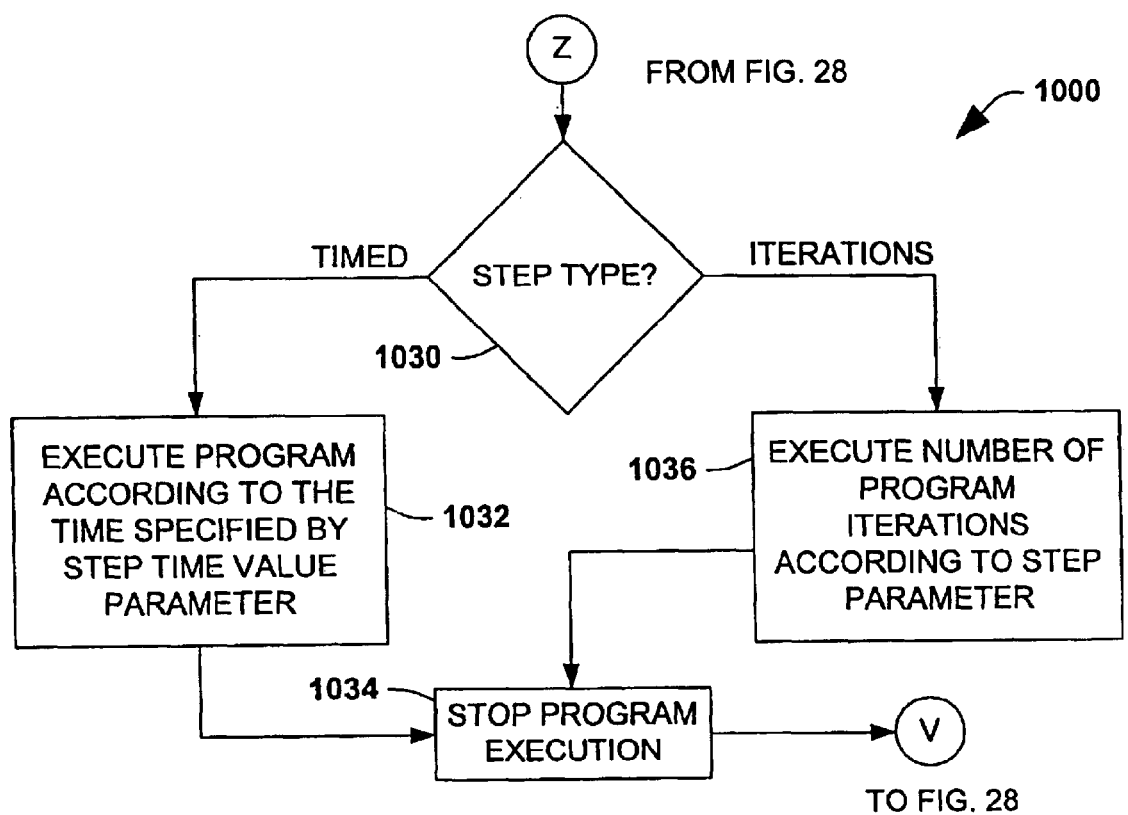
FIG. 29 is a flow diagram illustrating further aspects of the method of FIGS. 27 and 28.

Referring now to FIGS. 27–29, another exemplary method 1000 of performing a function in a control system or device is illustrated in accordance with the invention. A change mode message is received at step 1002, after which execution of the program stored in the control device is stopped or suspended at step 1004. Thereafter the device waits for a step parameter message at steps 1006 and 1008. It will be further appreciated that messages other than step parameter type messages may be received at this point (e.g., I/O messages, other mode change messages, etc.), which may be operated on and/or responded to accordingly. However, for the sake of brevity, the method 1000 is illustrated in FIG. 27 as waiting for a step parameter type message via steps 1006 and 1008.

Once a step parameter message (e.g. message 900 of FIG. 25) is received at step 1008, the step type and parameter are obtained therefrom at step 1010. The device then waits for receipt of another message at steps 1012 and 1014 (FIG. 28).

Upon receipt of a message at step 1014, decision step 1016 determines the message type. If the message is a step command message, the step command is executed as described in greater detail infra and illustrated in FIG. 29. If the message is a change mode message, the device changes mode according to the mode change message at step 1020, after which program execution is resumed according to the new mode at step 1022. If the new message is not a step command or mode change type message (e.g., I/O or other explicit message), the device (e.g., device 710 and/or 712) provides status information and/or data (e.g., via a network message to the requester), or otherwise responds to the message at step 1024, and returns to step 1012 to await further messages.

Referring now to FIG. 29, if the message received at step 1014 is a step command type message, the device determines whether the step type (e.g., step type 906 of FIG. 25) is timed or iteration at step 430. If the step type is timed step, the device (e.g., device 710 and/or 712) executes its stored control program according to the time specified by the step time value parameter at step 1032 before program execution is suspended or stopped at step 1034. Alternatively, if the step type is iterations at step 1030, the device executes the number of program iterations according to the step parameter at step 1036 before program execution is stopped or suspended at step 1034. Once the program has been stepped (e.g., timed step via step 1032 or iteration stepped via step 1036), and the program execution has again been stopped or suspended at step 1034, the device again waits for a message at step 1012 of FIG. 28. Thus, a user may perform stepped execution of the control or logic program stored in the device, and obtain process or other information from the device at step 1024 via I/O or other explicit messages while the program execution is suspended. Proceeding in this fashion, a user may advantageously troubleshoot system programming and other errors in widely distributed control systems.

It will be recognized that more than one device (e.g., devices 710 and/or 712) may be placed into step mode and respond to step commands, etc., via a single message. In this way, a user can synchronize single steps of distributed control system execution with a single network message. For example, a user may send a message from computer 704 in FIG. 19 to PLC 708, device 710 and device 712 to perform a specified time period of execution of the programs stored therein. Thereafter, data relating to the controlled processes 716, 720, and/or 722, respectively, can be obtained from the devices 708, 710, and/or 712 while the execution of these programs is stopped or suspended. This method or process can be repeated any number of times in order to facilitate the identification of problems and/or programming errors in the system hardware, logic programs, actuators, etc. In addition, different devices (e.g., devices 708, 710, and/or 712) may be sent different step parameters via a number of addressed step parameter messages, and then started via a single broadcast step command message. The present invention thus provides powerful diagnostic and debugging methods particularly applicable to widely distributed control systems. It will be further recognized that many message protocols are possible within the scope of the invention, beyond those illustrated and described herein.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A Modular conveyor network system comprising:
   a plurality of conveyor units connected there together in a network;
   a control system associated with each conveyor unit, the control system comprising an output module to control an output device based on network messages and/or a local logic function; and
   the output module comprising a value source selector to receive and send messages to and from the network, wherein the source selector is associated with the logic function to create a binding.

2. The system of claim 1, the logic function including one or more functions blocks including, Boolean operators, bi-stable functions, counters, timers and/or analog functions.

3. The system of claim 1, wherein the output device is a drive controller.

4. The system of claim 1, wherein the output module comprises a processor and a stored control program to implement one or more control strategies.

5. The system of claim 4, wherein the control program employs user defined attributes including at least one of idle action, idle value, fault action, fault value, force enable attribute and override attribute.

6. The system of claim 1, wherein the source selector can be configured to ignore I/O and explicit messages from the network based on the binding.

7. The system of claim 6, wherein explicit messages include one of configuration information, transferred data, messages to I/O ports, component fault information, and requests.

8. The system of claim 6, the output module further comprising an input unit to measure one or more process variables and provide them to the logic function.

9. The system of claim 8, wherein the process variables correspond to status or event indicators related to the conveyor system.

10. The system of claim 6, wherein the selector can utilize a fault action and set an output value in accordance with a stored fault value based on an override attribute.

11. The system of claim 10, wherein the selector can selectively ignore messages in accordance with the override attribute.

12. The system of claim 10, wherein a user defines the override attribute.

13. A modular conveyor system comprising:
    a plurality of conveyor unit connected together via a network to facilitate implementation of a control strategy;
    a means for enabling control systems associated with each conveyor unit to select amongst several output sources providing output to a conveyor drive controller.

14. The system of claim 13, wherein the means for selecting output sources includes a selector component that generates output based on a binding associated with a logic function.

15. The system of claim 14, wherein the selector component ignores control information received from an I/O or explicit message service.

16. A modular control system methodology for providing an output value to a driver controller including:
    receiving a binding defined by a user between a controller and a logic function;
    ignoring explicit messages and I/O messages received from a conveyor network; and
    setting the output value in accordance with the logic function.

17. A computer readable medium having stored thereon computer executable instructions for carrying out the method of claim 16.

18. The method of claim 16, further comprising detecting the presence of a fault and setting the output value according to swred fault value settings unless an override attribute is set.

19. The method of claim 18, further comprising receiving a force message from a master controller and setting the output value to the supplied force value if a output force feature has been enabled.

20. The method of claim 19, further comprising receiving an idle event action and setting the output value to associated idle values implementing an idle action unless an override attribute is set or the logic function is disabled.

21. A modular conveyor system comprising:
    a controller associated to at least one of a plurality of conveyor units in a network; and
    a value source selector that receives a message and/or a logic function from the network to bind the value source selector and the logic function, wherein the binding defines a location source of an output value for the controller.

22. The system of claim 21, wherein the value source selector employs user defined attributes including at least one of idle action, idle value, fault action, fault value, force enable attribute and override attribute.

23. The system of claim 21, wherein the output value controls a drive controller.

24. The system of claim 21, wherein the value source selector binds the logic function with at least one status and/or event indicator.

25. The system of claim 24, wherein the status and/or event indicator is a list and/or table in a memory that is updateable and accessible by a processor.

26. The system of claim 21, wherein the value source selector can be configured to ignore I/O and explicit messages from the network based on the binding between the source selector and the logic function.

27. The system of claim 26, wherein the value source selector utilize a fault action and set an output value in accordance with a stored fault value based on an override attribute.

28. The system of claim 27, wherein the value source selector can selectively ignore a message based on the override attribute.

29. The system of claim 27, wherein a user defines the override attribute.

30. A modular conveyor system comprising:
a controller associated with a plurality of networked conveyor units, the controller comprising:
a value source selector that receives a plurality of messages and/or signals from a network, and employs a logic function to provide an output to a drive controller in connection with controlling a process associated with the conveyor units.

31. A modular conveyor system comprising:
a plurality of conveyor units operatively coupled together via a network; and
a value source selector that enables the conveyor units to selectively provide a subset of a plurality of available outputs to a conveyor drive controller to facilitate control of a process.

* * * * *